United States Patent
Moriyama et al.

(10) Patent No.: US 6,330,500 B1
(45) Date of Patent: Dec. 11, 2001

(54) ACTUATION CONTROLLER FOR AIR BAG DEVICE

(75) Inventors: Hiroshi Moriyama; Mitsuru Ono; Hiroyuki Sada, all of Ibaraki (JP)

(73) Assignee: Autoliv Japan., Ltd., Kanagawa (JP)

( * ) Notice: Subject to any disclaimer, the term of this patent is extended or adjusted under 35 U.S.C. 154(b) by 0 days.

(21) Appl. No.: 09/423,920

(22) PCT Filed: Mar. 30, 1998

(86) PCT No.: PCT/JP98/01448

§ 371 Date: Feb. 14, 2000

§ 102(e) Date: Feb. 14, 2000

(87) PCT Pub. No.: WO98/51544

PCT Pub. Date: Nov. 19, 1998

(30) Foreign Application Priority Data

| May 16, 1987 | (JP) | 9-141187 |
| Oct. 6, 1997 | (JP) | 9-287608 |
| Oct. 20, 1997 | (JP) | 9-303303 |
| Nov. 21, 1997 | (JP) | 9-337809 |
| Dec. 11, 1997 | (JP) | 9-361698 |

(51) Int. Cl.$^7$ .................................................. B60R 21/32
(52) U.S. Cl. ............................ 701/45; 701/47; 280/735; 180/232
(58) Field of Search .................................. 701/45, 46, 47; 280/735, 741, 734; 180/232, 271, 282

(56) References Cited

U.S. PATENT DOCUMENTS

| 4,243,248 | 1/1981 | Scholz et al. ........................ 280/735 |
| 4,836,024 | * 6/1989 | Woehrl et al. ......................... 73/514 |

(List continued on next page.)

FOREIGN PATENT DOCUMENTS 2 293 681   4/1996   (GB) .

3-20674   1/1991   (JP) .

(List continued on next page.)

OTHER PUBLICATIONS

International Search Report, PCT/JP98/01148, Date of Competion Jun. 23, 2998.

*Primary Examiner*—Tan Nguyen
(74) *Attorney, Agent, or Firm*—Merchant & Gould P.C.

(57) ABSTRACT

In an air bag system of the type that inflates one air bag using a plurality of inflators, an air bag inflation control apparatus is provided that can make a proper determination of inflator activation mode and a correct decision to activate or not activate the inflators according to the severity of a collision. More specifically, the invention provides an activation control apparatus for an air bag system having a plurality of inflators for one air bag, which, upon detection of a vehicle collision, controls activation of the inflators in accordance with the severity of the collision, comprising: a first acceleration sensor 1, mounted in a position within a passenger compartment, for constantly detecting acceleration G at the mounting position; and a second acceleration sensor 2, mounted in a position within a crush zone in a forward part of a vehicle, for constantly detecting acceleration G' at the mounting position, and wherein: a decision to activate or not activate the plurality of inflators and determination of the activation mode of the inflators are determined by utilizing differences in characteristics among various values in various types of collision and by combining the various values as appropriate, the various values consisting of a first time-integrated value V1 obtained by performing time integration based on an acceleration signal from the first acceleration sensor 1 and a second time-integrated value V1' obtained by performing time integration based on an acceleration signal from the second acceleration sensor 2, and of an integrated value difference between the second time-integrated value and the first time-integrated value, Vd=V1'−V1, or the amount of change of the integrated value difference, (Gd=d(Vd)/dt).

40 Claims, 22 Drawing Sheets

U.S. PATENT DOCUMENTS

| | | | | |
|---|---|---|---|---|
| 5,285,188 | * | 2/1994 | Yoshida | 340/436 |
| 5,390,951 | * | 2/1995 | Iyoda | 280/730 |
| 5,967,548 | * | 10/1999 | Kozyreff | 280/735 |
| 5,997,033 | * | 12/1999 | Gray et al. | 280/735 |
| 6,064,928 | * | 5/2000 | Wilson et al. | 701/34 |
| 6,070,113 | * | 5/2000 | White et al. | 701/45 |

FOREIGN PATENT DOCUMENTS

| | | |
|---|---|---|
| 3-121951 | 5/1991 | (JP) . |
| 3-246139 | 11/1991 | (JP) . |
| 5-193439 | 8/1993 | (JP) . |
| 7-69171 | 3/1995 | (JP) . |

\* cited by examiner

Fig.12
(A)
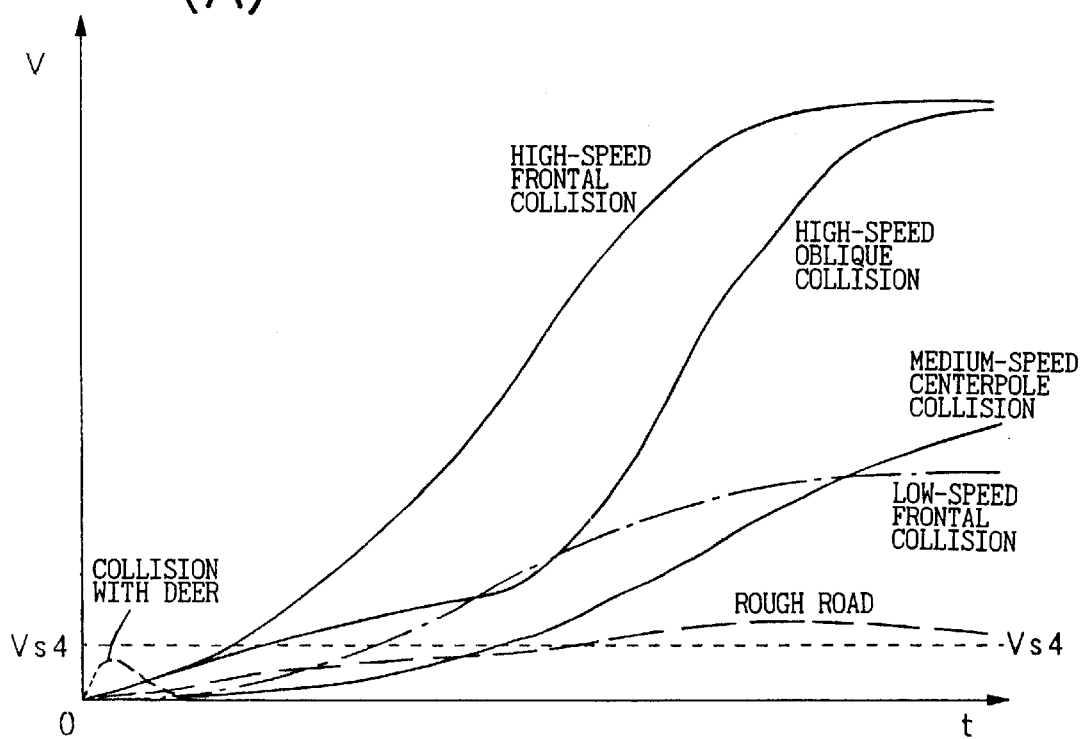
(B)
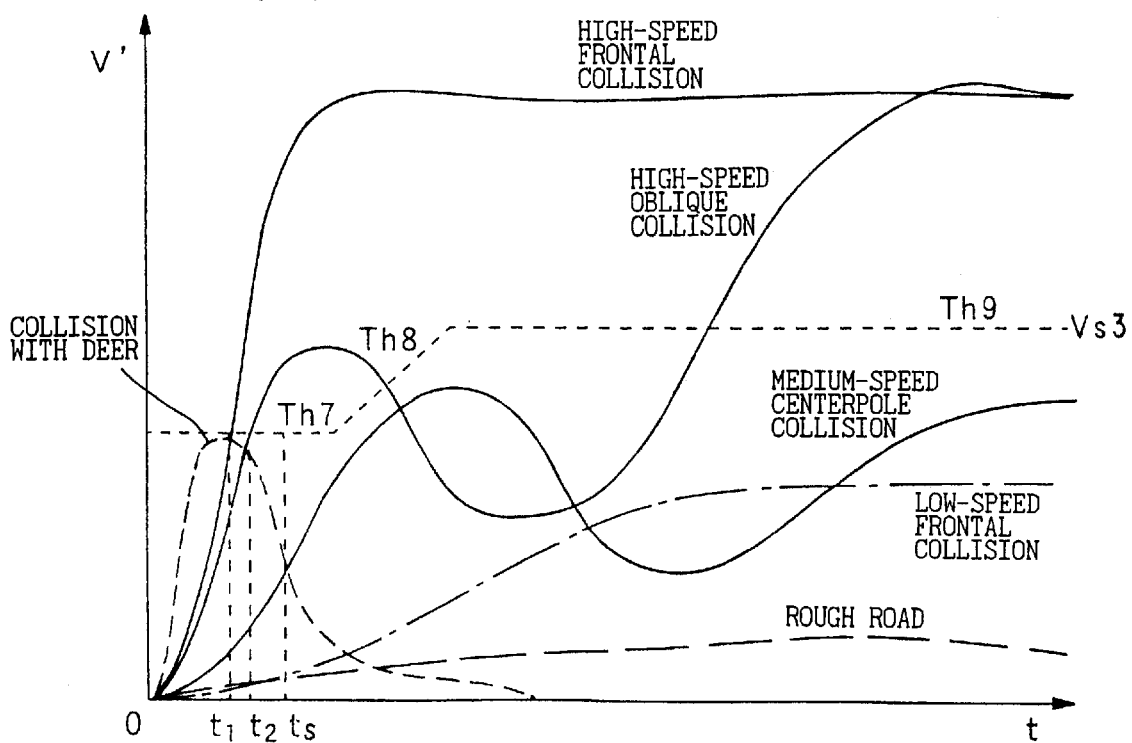

ACTUATION CONTROLLER FOR AIR BAG DEVICE

TECHNICAL FIELD

The present invention relates to an activation control apparatus for an air bag system for activating the air bag system by detecting a vehicle collision, and more particularly, in an air bag system of the type that inflates one air bag using a plurality of inflators, the invention relates to a novel air bag inflation control apparatus that can make a proper determination of inflator activation mode and a correct decision to activate or not activate the inflators according to the severity of a collision.

BACKGROUND ART

Air bag systems generally used in the past are of the type that inflates one air bag using a single inflator. In this type of air bag system, the change of acceleration of a vehicle is constantly monitored using an acceleration sensor mounted in a passenger compartment, and the resulting acceleration signal is processed by performing appropriate mathematical operations such as first integration or second integration; then, the result is compared with a predetermined threshold value and, if it exceeds the threshold value, an activation signal is issued to an inflator ignition circuit to activate the inflator and thus inflate the air bag.

Since this type of air bag system is designed, based on safety standards, to produce maximum performance in a frontal collision at 50 km/h, the air bag is inflated with designated characteristics if only the threshold value is exceeded, regardless of the severity of the collision or the position or posture of the vehicle occupant. Therefore, in a low-speed or medium-speed collision, the air bag is inflated with a inflating energy excessive for occupant protection, giving rise to the possibility that, if the occupant is seated close to the air bag, or in the case of a small sized occupant, the occupant may be injured by the inflation of the air bag.

As for the acceleration sensor used to determine whether to activate or not activate the inflator, there are two types according to the sensor mounting position: one is the integral type in which the sensor is assembled into the air bag module and mounted in the steering wheel, and the other is the separate type in which the sensor is on the driver's seat side in the passenger compartment. In the case of the integral type, the acceleration sensor detects the impact of the collision transmitted through the steering shaft, and in the case of the separate type, the acceleration sensor is mounted on a bracket attached to the vehicle body and detects the impact of the collision transmitted to the inside of the passenger compartment through the vehicle body; in either case, the decision whether to inflate or not inflate the air bag is made based on the change of acceleration detected by the acceleration sensor mounted within the passenger compartment that has a structure of high rigidity and is less subjected to deformation in the event of a collision.

Some vehicle types in which impacts at the front of the vehicle are difficult to transmit to the inside of the passenger compartment employ a system that uses an electronic acceleration sensor mounted inside the passenger compartment in combination with a mechanical sensor mounted in a crush zone, such as an engine compartment, in the forward part of the vehicle, but since the mechanical sensor, because of its characteristics, is only capable of making an ON/OFF decision and is used in conjunction with a collision discrimination system that uses the acceleration sensor mounted inside the passenger compartment, if a localized impact such as hammering is input to the mechanical sensor, an erroneous activation may result.

In recent years, there has been proposed a system generally known as the "smart air bag system" which employs a plurality of inflators and controls the mode of air bag inflation in an optimum manner by controlling the output level of the inflators in accordance with the type of collision and the condition of the occupants. To implement this system, an ignition decision with a timing earlier than the conventional ignition decision timing becomes necessary to perform computations for inflator output control, but such an early decision system has yet to be proposed.

The present invention has been devised to address the above problems, and an object of the invention is to provide a novel air bag activation control apparatus that can make the ignition decision earlier and more timely than previous systems, and that drastically reduces the possibility of erroneous activation by correctly discriminating impacts even in situations of improper use (hereinafter called the "abuse") such as hammering or rough road driving that could result in an erroneous activation if the discrimination were made replying only on the passenger compartment acceleration sensor.

DISCLOSURE OF THE INVENTION

The present invention has been devised in view of the above situation, and its feature is that a second electronic acceleration sensor is mounted in the crush zone in the forward part of a vehicle to supplement the first electronic acceleration sensor mounted, as in a conventional system, inside the vehicle's passenger compartment, with provisions made to make a decision as to whether to inflate or not inflate the air bag (to activate or not activate inflators) and determine the inflation mode of the air bag (inflator activation mode) by utilizing the differences in characteristics between acceleration signals generated by the respective acceleration sensors in various types of collision. In a specific method of computation, the decision as to whether to activate or not activate the inflators and determination of the inflator activation mode are made by utilizing the differences in characteristics among various values in various types of collision and by combining the various values as appropriate, the various values including a first time-integrated value obtained by performing time integration based on the acceleration signal from the first acceleration sensor, a second time-integrated value obtained by performing time integration based on the acceleration signal from the second acceleration sensor, an integrated value difference between the first time-integrated value and the second time-integrated value, and the amount of change of the integrated value difference.

The method of the present invention can be roughly divided into two methods: the first method that utilizes the characteristics of the integrated value difference between the first time-integrated value and the second time-integrated value, and the second method that only utilizes the differences in characteristics between the first time-integrated value and the second time-integrated value in various types of collision.

The first method provides two methods for determining the inflator activation mode: one is to compare the integrated value difference between the first time-integrated value and the second time-integrated value with a predetermined threshold value given as a function of time, and to determine the inflator activation mode based on the result of the comparison, and the other is to compare the second time-integrated value with a predetermined threshold value given as a function of time, and to determine the inflator activation mode based on the result of the comparison. There are two modes of inflator activation, a rapid inflation mode for rapidly inflating the air bag and a moderate inflation mode for inflating the air bag at a moderate speed.

Whether to activate or not activate the inflators is determined in one of the following eight ways.

(a) The decision whether to activate or not activate the inflators is made by comparing the integrated value difference between the first time-integrated value and the second time-integrated value with a predetermined threshold value given as a function of time.

(b) The decision whether to activate or not activate the inflators is made by comparing the amount of change of the integrated value difference (time differential of the difference between the integrated values) with a predetermined threshold value given as a function of time.

(c) The decision whether to activate or not activate the inflators is made by using the above two methods (a) and (b) in parallel and by judging whether at least one or the other of the methods satisfies the condition for inflator activation.

(d) In addition to using the above two methods (a) and (b), the first time-integrated value is compared with a predetermined threshold value given as a function of time, and the decision whether to activate or not activate the inflators is made by judging whether at least one of methods (a) and (b) satisfies the condition for inflator activation and, at the same time, whether the first time-integrated value is not less than a predetermined threshold value given as a function of time.

(e) The decision whether to activate or not activate the inflators is made by comparing the time-integrated value difference with a predetermined threshold value set as a function of the first time-integrated value.

(f) The decision whether to activate or not activate the inflators is made by using the above two methods (b) and (e) in parallel and by judging whether at least one or the other of the methods satisfies the condition for inflator activation.

(g) The decision whether to activate or not activate the inflators is made by comparing the second time-integrated value with a predetermined threshold value set as a function of the first time-integrated value.

(h) The decision whether to activate or not activate the inflators is made by using the above two methods (b) and (g) in parallel and by judging whether at least one or the other of the methods satisfies the condition for inflator activation.

The second method of the invention further includes two type of methods (method A and method B). In the method A, whether to activate or not activate the inflators (that is, whether to inflate or not inflate the air bag) is determined by performing a prescribed computation based on the acceleration signal from the first acceleration sensor mounted inside the passenger compartment, while the inflator activation mode (that is, the air bag inflation mode) is determined by performing a prescribed computation based on the acceleration signal from the second acceleration sensor mounted in the crush zone.

On the other hand, in the method B, the time-integrated value based on the acceleration signal from the second acceleration sensor is compared with a predetermined velocity threshold value given as a function of time, and the inflator activation mode is determined based on the result of the comparison, while the same time-integrated value is compared with a predetermined threshold value given as a function of the time-integrated value based on the acceleration signal from the first acceleration sensor mounted inside the passenger compartment, and the decision to activate or not activate the inflators is made based on the result of the comparison.

The method A includes a method in which the computation for determining the inflator activation mode based on the second acceleration sensor is suspended for a predetermined period of time from the starting of the computation based on the second acceleration sensor, thereby preventing an erroneous activation in the early stages of collision, or the value computed based on the first acceleration sensor mounted inside the passenger compartment is used in combination, to enhance the accuracy of the inflator activation mode determination.

In each of the methods A and B, there are two modes of inflator activation, a rapid inflation mode for activating the inflators in such a manner as to cause the air bag to inflate rapidly, and a moderate inflation mode for activating the inflators in such a manner as to cause the air bag to inflate at a moderate speed. The rapid inflation is accomplished either by activating all the inflators simultaneously or by activating all the inflators by slightly displacing ignition timing between the inflators, while the moderate inflation is accomplished either by activating only a specified number of inflators or by igniting the inflators in sequence with a longer ignition timing difference between each inflator. By combining these inflator activation modes, the moderate and rapid inflation of the air bag are combined as needed and selected appropriately according to the type of vehicle and the type of vehicle body structure.

In either method, the present invention can prevent an erroneous activation due to rough road driving or abuse or in a deer collision (a collision with a deer or like animal—the same applies hereinafter) where inflator activation is not needed, and can make a correct determination of the ignition timing in a high-speed frontal collision (a frontal collision in high-speed driving—the same applies hereinafter) and in a high-speed oblique collision (a collision at an oblique angle from the front in high-speed driving—the same applies hereinafter).

In each of the above methods, it will be preferable from the viewpoint of optimizing the inflator activation if provisions are made so that when an inflator activation instruction is issued with the inflator activation mode determined as the moderate inflation mode, first a specified number of the inflators are activated in accordance with the moderate inflation mode, while allowing the computation to continue for the inflator activation mode determination, and if, as the result of the computation, the mode switches to the rapid inflation mode, the remaining inflators are activated.

In the above method, it will also be preferable to hold off the determination of the inflator activation mode for moderate inflation and allow the computation to continue until a predetermined time elapses after the computation based on the second acceleration sensor is started, since the accuracy of the inflator activation mode determination can then be enhanced.

BRIEF DESCRIPTION OF THE DRAWINGS

FIG. 12 presents diagrams each showing the change over time of a time-integrated value obtained by time-integrating the acceleration value detected by an acceleration sensor, in which part (A) is a diagram showing the change of the first time-integrated value based on the first acceleration sensor mounted inside the passenger compartment, and part (B) is a diagram showing the change of the second time-integrated value based on the second acceleration sensor mounted in the crush zone;

BEST MODE FOR CARRYING OUT THE INVENTION

Figure 1:
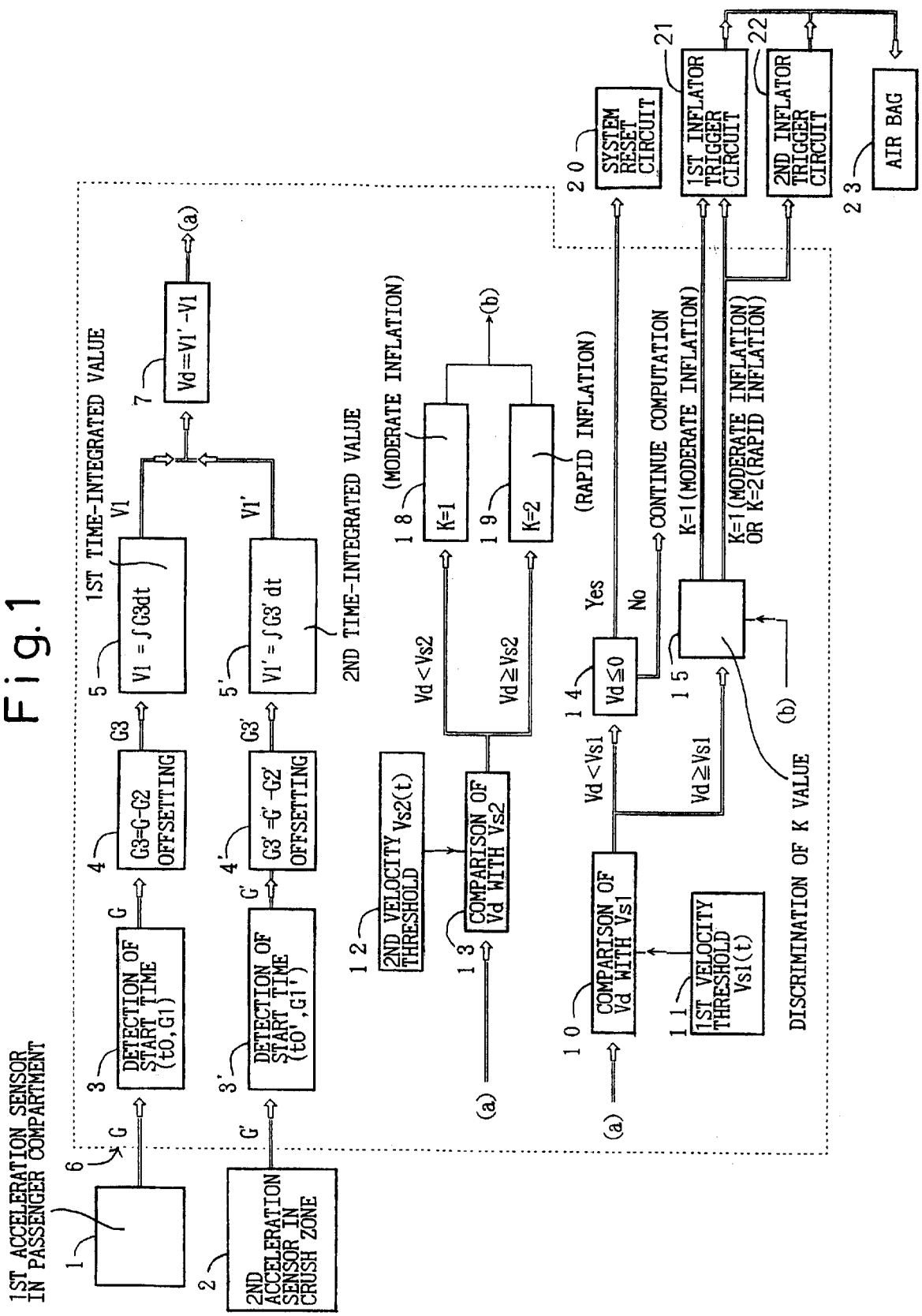
FIG. 1 is a block diagram showing one embodiment of an air bag activation control apparatus according to the first method of the present invention.

Embodiments of the present invention will be described below with reference to the accompanying drawings. FIG. 1 is a block diagram showing a first embodiment of the air bag activation control apparatus of the present invention; this embodiment concerns the basic mode for implementing the first method previously described. In the figure, two acceleration sensors are installed which consist of the first acceleration sensor 1 mounted inside the passenger compartment, as in a conventional system, and the second acceleration sensor 2 mounted in the crush zone. The crush zone here refers to a space within the vehicle body, located forward of the passenger compartment, and has the effect of mitigating damage to the passenger compartment in the event of a collision by crushing prior to the deformation of the passenger compartment; generally, the forward part of the engine compartment serves as the crush zone.

Acceleration signals G and G' generated by the acceleration sensors 1 and 2 are coupled via a computation circuit 6 to a reset circuit 20 and two inflator trigger circuit 21 and 22. Each trigger circuit is configured to ignite its associated inflator (not shown) to inflate the air bag 23.

To describe the computation circuit 6, the acceleration signal G generated by the first acceleration sensor 1 in the passenger compartment is fed to a block 3 which is a computation start point detection circuit; when time t0 at which the acceleration value G exceeds a predetermined acceleration G1 is detected, a prescribed computation based on the acceleration G is started at that point in time. The block 4 that follows is a subtracting means which subtracts a predetermined acceleration G2 from the acceleration value G after the computation start time t0 and thereby offsets the acceleration value G to eliminate noise and minute variations in acceleration. Next, the decreased acceleration G3 output from the subtracting means 4 is fed into an integrating means 5 which integrates the acceleration G3 over time to compute a first time-integrated value V1. On the other hand, the acceleration signal G' generated by the second acceleration sensor 2 mounted in the crush zone is fed to a block 3' which is a computation start point detection circuit; when time t0' at which the acceleration value G' detected by the second acceleration sensor 2 exceeds a predetermined acceleration G1' is detected, a prescribed computation based on the acceleration value G' is started at that point in time, and in the following block 4' which is a subtracting means, a predetermined acceleration G2' is subtracted from the acceleration value G' after the computation start time t0', to compute a decreased acceleration G3', and the acceleration G3' is integrated over time by an integrating means 5' to compute a second time-integrated value V1'.

Here, an explanation will be given of the difference between the first time-integrated value V1, obtained by performing time integration based on the acceleration signal from the first acceleration sensor 1 mounted inside the passenger compartment, and the second time-integrated value V1', obtained by performing time integration based on the acceleration signal from the second acceleration sensor 2 mounted in the crush zone. FIGS. 12(A) and 12(B) are diagrams showing the change over time of the above values V1 and V1': part (A) is a V1-t diagram and (B) is a V1'-t diagram, and the time axis t is shown on the same scale for both diagrams. It can be seen clearly from the two diagrams that, for all types of collision, the second time-integrated value V1' based on the second acceleration sensor 2 in the crush zone reaches a greater value at an earlier point in time than does the first time-integrated value V1 based on the first acceleration sensor 1.

Especially, in a high-speed frontal collision, which is one of the severe collision types, V1' quickly rises to a large value and, likewise, in a high-speed oblique collision, which is also one of the severe collision types, V1, quickly rises in the early stage, as in the high-speed frontal collision; on the other hand, V1 rises slowly during the early stage and, at an intermediate point, begins to rise quickly. Further, in the case of a medium-speed centerpole collision (a frontal collision at a medium speed against a pole-like object such as an iron pole), since a small area centering around the part that hit the pole is heavily crushed, deforming only the bumper or the front end part of the vehicle in the early stages of collision, for some time after the collision V1 shows a value lower than that in a low-speed frontal collision that basically does not require air bag inflation, and it is not until after an appreciable length of time that the value V1 becomes higher than that in the low-speed frontal collision. Accordingly, if the decision is made based on V1, the air bag may not inflate at all or, if it does inflate, it may be too late to provide the intended protection; in contrast, V1' shows a value higher than that in the low-speed frontal collision from the beginning. In the case of a collision with deer, only a slight change appears in the value of V1, but V1' shows a value as large as a maximum value in the low-speed collision. This is because when a vehicle collides with a deer or the like, since the vehicle hits the deer away from it at the instant of the collision, a relatively large variation in acceleration occurs in the crush zone with the crush zone suffering some degree of deformation, but the impact is absorbed by the crush zone so that little change in acceleration occurs in the passenger compartment. In the case of rough road driving, V1 and V1' show similar waveforms between them. This is because no deformation is caused to the vehicle body during rough road driving, causing no appreciable differences due to the mounting position of the acceleration sensors.

As described above, in medium-to-high speed collisions that cause localized crushing or deformation of the crush zone in the forward part of the vehicle in the initial stage of collision, V1' rises earlier than V1, whereas in rough road driving, etc. that do not cause deformation to the crush zone, V1 and V1' show substantially the same waveforms. In a low-speed collision that causes a lesser degree of deformation to the crush zone, V1' has a tendency to rise earlier than V1, but since the degree of deformation is smaller, the difference is correspondingly smaller.

From these phenomena, it can be seen that unique differences exist according to the type of collision between the second time-integrated value V1' based on the second acceleration sensor 2 mounted in the crush zone according to the present invention and the first time-integrated value V1 based on the first acceleration sensor 1 mounted, as in a conventional system, inside the passenger compartment. Therefore, by obtaining the difference between the two integrated values, the degree of collision severity can be determined more clearly according to the degree of deformation of the crush zone. The most notable feature of the present invention is that proper discrimination of the collision type and proper determination of the air bag inflation mode are made by making use of the above characteristics.

Next, a description will be given of how the decision to activate or not activate the inflators and determination of the activation mode are made in the first method of the present invention. As shown in FIG. 1, first a subtracting means 7 subtracts the first time-integrated value V1, obtained by performing time integration based on the first acceleration sensor 1, from the second time-integrated value V1', obtained by performing time integration based on the second acceleration sensor 2, and thus obtains the difference Vd between the integrated values. The integrated value difference Vd is then compared in a comparator 13 with a second velocity threshold value Vs2 preset in a block 12 as a threshold value that varies as a function of time; when Vd<Vs2, it is determined that the degree of collision severity is not high, and an inflator activation mode signal (K=1) for causing the air bag to inflate at a moderate speed is sent from a block 18 to a block 15. On the other hand, when Vd≧Vs2, it is determined that the degree of collision severity is high, and an inflator activation mode signal (K=2) for causing the air bag to inflate rapidly is sent from a block 19 to the block 15.

Figure 13:
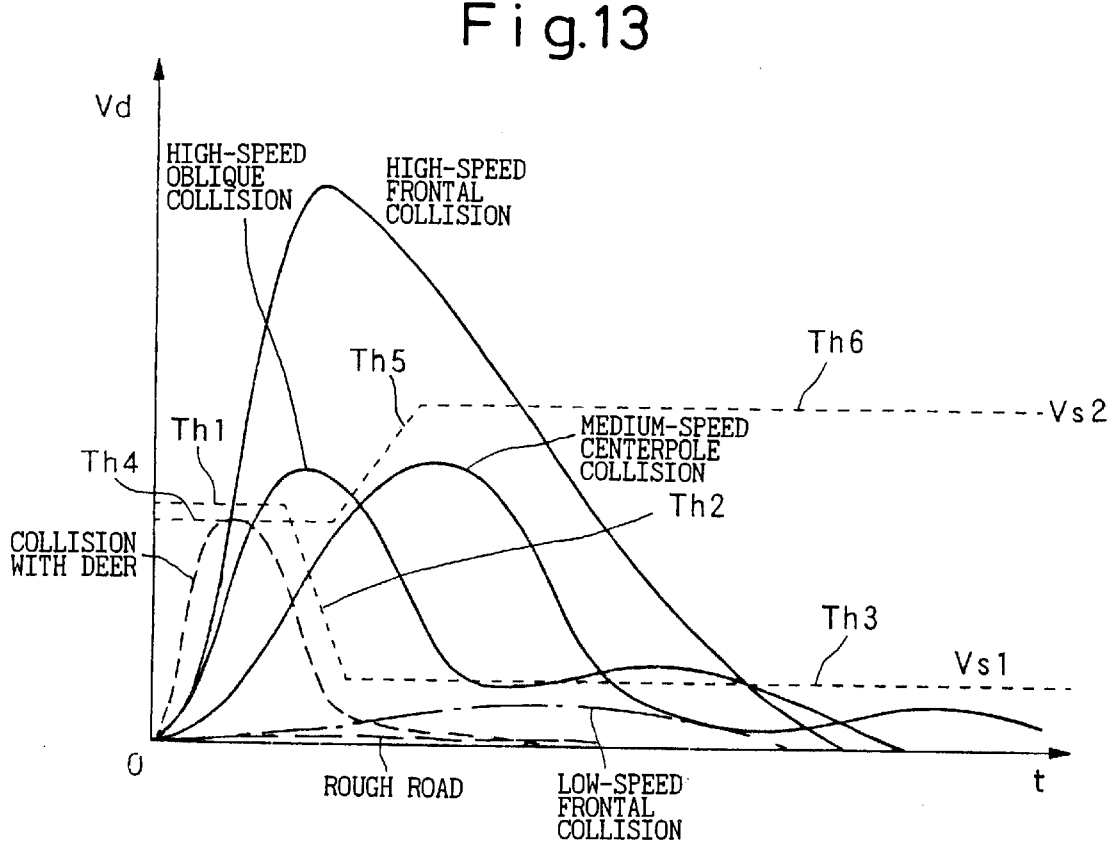
FIG. 13 is a diagram showing the change over time of an integrated value difference representing the difference between the first time-integrated value and the second time-integrated value.

Here, the relationship between the integrated value difference Vd and the second velocity threshold value Vs2 will be described below with reference to FIG. 13. FIG. 13 is a diagram showing the relationship between the integrated value difference Vd and time t in various types of collision. As can be seen from the figure, for the high-speed frontal and high-speed oblique collisions which are severe collisions, Vd shows large values in the early stages of collision, compared with the temporal change of the first time-integrated value V1 shown in FIG. 12(A); furthermore, these values rise quickly with a distinctly recognizable time difference compared with the value for the medium-speed centerpole collision, another collision event that requires air bag inflation. If the second velocity threshold value Vs2 is made up of Th4 which shows a constant value regardless of time during the early stages, Th5 which gradually increases after the passage of a predetermined time, and Th6 which shows a high value during the remaining stage, as illustrated, then in a severe collision event, such as a high-speed frontal or oblique collision, the inflator activation mode can be determined in the early stages of collision.

Next, the inflator activation mode will be described. There are two modes for air bag inflation: moderate inflation in which the air bag is inflated at a moderate speed, and rapid inflation in which the air bag is rapidly inflated. Whether the air bag is inflated moderately or rapidly is determined by controlling the number of inflators activated or the activation timing of the inflators, or by controlling both. This will be described below.

(a) In the first method, the air bag is inflated moderately or rapidly by controlling the number of inflators activated; in the moderate inflation mode, only the first inflator is ignited, while in the rapid inflation mode, both the first and second inflators are ignited. In the rapid inflation mode, finer control of the inflation is possible by providing a difference (including zero difference) in ignition timing between the first inflator and the second inflator.

(b) In the second method, the air bag is inflated moderately or rapidly by controlling the ignition timing of the first and second inflators; in the moderate inflation mode, the air bag is inflated at a moderate speed by increasing the ignition timing difference between the first inflator and the second inflator, while in the rapid inflation mode, the air bag is fired rapidly by reducing (or zeroing) the ignition timing difference between the two inflators.

Next, the method of deciding activation or non-activation of the inflators will be described. The integrated value difference Vd is fed to a comparator 10 where it is compared with a first velocity threshold value Vs1 preset in a block 11 as a threshold value that varies as a function of time; when Vd≧Vs1, it is determined that inflator activation is needed, and an inflator activation instruction signal is sent to the block 15. Based on the inflator activation mode signal (K=1 or 2) supplied from the block 18 or 19, the block 15 directs the inflator trigger circuits 21 and 22 to output trigger signals by which the inflators (not shown) are activated to inflate the air bag 23. In FIG. 1, the line for supplying the moderate inflation signal (K=1) from the block 15 directly to the first inflator trigger circuit 21 is for the case where only the first inflator is activated in the moderate inflation mode, while the line for supplying the moderate inflation signal (K=1) and rapid inflation signal (K-2) from the block 15 to the inflator trigger circuits 21 and 22 is for the case where the two inflators are activated by displacing the ignition timing between them.

When the integrated value difference is smaller than the first velocity threshold value (Vd<Vs1), a comparing means 14 compares Vd with a value preset at or near zero (0); if Vd is not larger than the preset value (for example, not larger than zero), the system is reset by the system reset circuit 20, and if Vd is larger than the preset value (for example, larger than zero), the computation in the computation circuit 6 is continued.

Next, the relationship between the value Vd and the first velocity threshold value Vs1 will be described with reference to FIG. 13. As shown, in the early stages of collision, the threshold value Vs1 is set at Th1 higher than the level of the deer collision; with this threshold value level, a severe collision event such as a high-speed frontal or high-speed oblique collision is discriminated in the early stages to issue an inflator activation command. In the following middle stage of collision, Vs1 is set as a gradually decreasing threshold value Th2 downward to the right (decreasing with time) and leading to a lower threshold value Th3 in the remaining stage; using this gradually decreasing threshold value Th2, a moderate-severity collision such as a medium-speed centerpole collision is discriminated to issue an inflator activation command. The lower threshold value Th3 in the remaining stage is used to decide whether to activate or not activate the inflators in a low-speed frontal collision event, and is set at such a value that does not trigger air bag inflation in a frontal collision at a speed lower than a predetermined speed.

In this figure also, the time axis is shown on the same scale as the time axis in the V1-t diagram of FIG. 12(A). As is apparent from a comparison between the two figure, in a severe collision such as a high-speed frontal or high-speed oblique collision, since activation commands can be issued to the inflators in the very early stages of collision, not only can the air bag be inflated without delay but, because of increased time margin for the determination of the ignition mode of each inflator, correspondingly longer computation time can be spared for the inflation mode control, increasing the accuracy of the computation for the air bag inflation control.

In the case of rough road driving, since the waveforms of V1 and V1' are substantially the same, as shown in FIGS. 12(A) and 12(B), the difference Vd is very small. As a result, if the decision is made based on Vd, an erroneous activation of the air bag during rough road driving can be completely prevented. Likewise, in a minor-severity collision that only causes a minor deformation to the vehicle body, the difference between the time-integrated values based on the respective acceleration sensors is small; in this case also, an erroneous activation can be prevented in a reliable manner. In view of this, if the second acceleration sensor 2 is mounted in a position within the crush zone where no deformation is caused in a minor severity collision such as a low-speed frontal collision, the waveforms of V1 and V1' become substantially the same in the case of low-speed frontal collisions, and the difference Vd can thus be held to a small value. This serves to prevent an erroneous activation in a low-speed collision in a more reliable manner.

Figure 2:
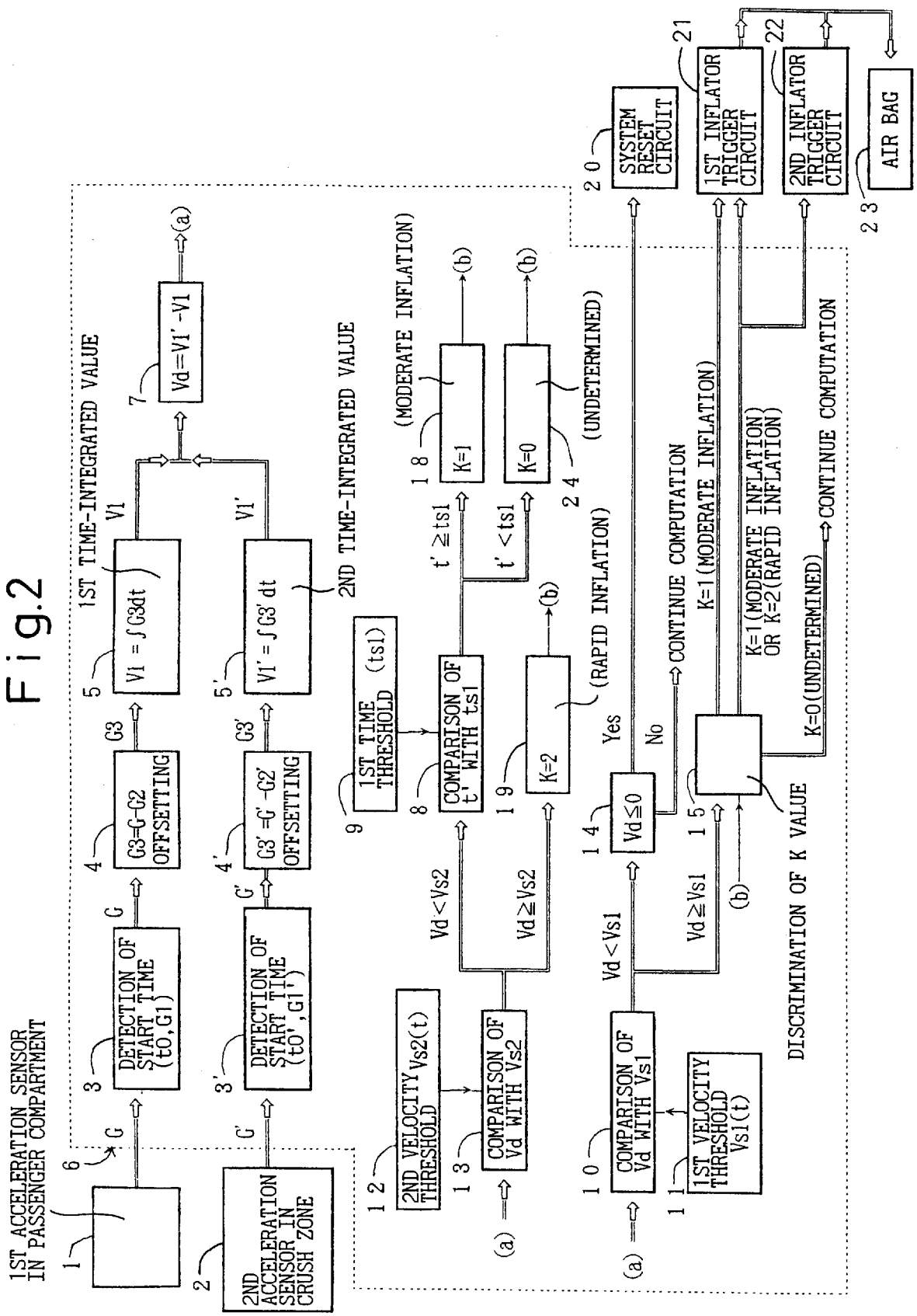
FIGS. 2 and 3 are block diagrams each showing a modified example of FIG. 1.

FIG. 2 shows a modified example of the first embodiment shown in FIG. 1. The difference from FIG. 1 is that when Vd<Vs2 as the result of the comparison between the integrated value difference Vd and the second velocity threshold value Vs2 in the comparator 13, elapsed time to from the starting time t0' of the computation based on the second acceleration sensor 2 is compared in a time comparator 8 with a predetermined first time threshold value ts1 before sending the result to the moderate inflation signal output device 18; then, when t'≧ts1, that is, only when the predetermined time has elapsed, the moderate inflation signal is sent from the block 18 to the block 15, but when the elapsed time is less than the predetermined time (t1<ts1), the determination of the K value is held off and the computation is continued. In other respects, the configuration is the same; therefore, the same elements are designated by the same reference numerals, and detailed descriptions thereof will not be repeated here.

More specifically, in the example of FIG. 2, when the integrated value difference Vd and the second velocity threshold value Vs2 are compared in the comparator 13, if Vd<Vs2, then the elapsed time t' from the time that the computation based on the second acceleration sensor 2 was started is compared in the block 8 with the predetermined the first time threshold value ts1; then, if t'<ts1, the determination of the K value is held off and a K value undetermined signal (K=0) is sent from a block 24 to the block 15 which, when the signal K=0 is received, allows the computation to continue further. On the other hand, when the predetermined time has elapsed, i.e., t'≧ts1, the determination of the K value so far held off is now made, and the resultant signal is sent to the block 18 which then sends the moderate inflation signal (K=1) to the block 15 as is done in the foregoing example. The reason for this is that even in a severe collision event such as a high-speed frontal or high-speed oblique collision, the value of Vd to be compared for the determination remains small in too early a stage of collision and, if the determination is made too early at this point in time, an erroneous determination may be made to inflate the air bag in the moderate inflation mode when the air bag should be inflated in the rapid inflation mode; accordingly, when Vd<Vs2, the case which normally commands a moderate inflation, the determination is held off and the computation is continued until the predetermined time elapses, in order to enhance reliability in determining the inflator activation mode.

On the other hand, when the result of the comparison between the integrated value difference Vd and the second velocity threshold value Vs2 in the comparator 13 shows Vd≧Vs2, that is, when it is determined that the air bag should be inflated in the rapid inflation mode (K=2), the signal is immediately sent to the block 15 without judging the elapsed time in the time comparator 8.

Figure 3:
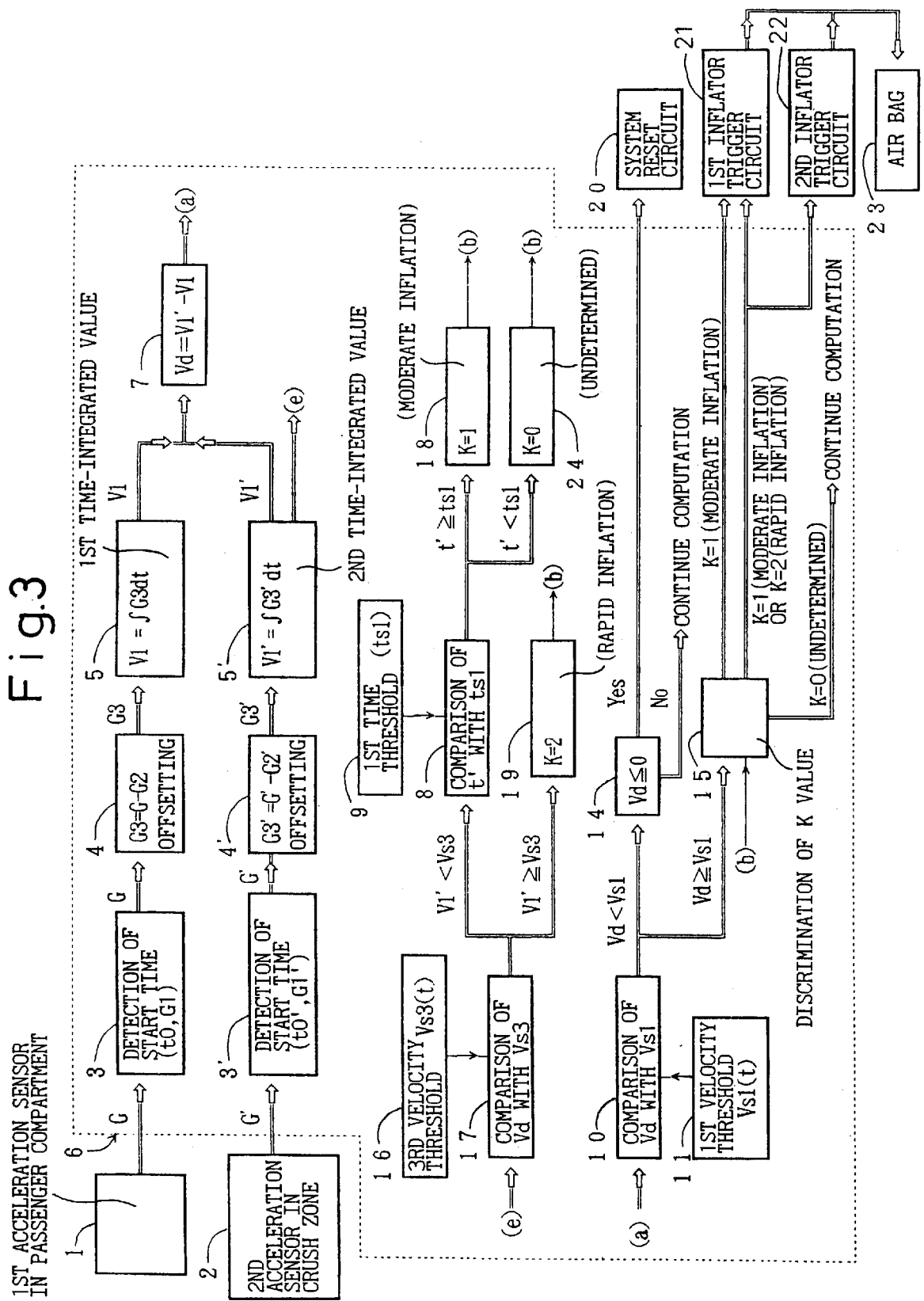

FIG. 3 shows another modified example of the first embodiment, illustrating an alternative method of determining the inflator activation mode. The difference from FIG. 2 is that the determination of the inflator activation mode is made not by comparing the integrated value difference Vd with the second velocity threshold value Vs2, but by comparing the second time-integrated value V1 based on the second acceleration sensor 2 with a third velocity threshold value Vs3 preset as a threshold value that varies as a function of time. In other respects, the configuration is the same; therefore, the same elements are designated by the same reference numerals, and detailed descriptions thereof will not be repeated here.

More specifically, in FIG. 3, the second time-integrated value V1' is fed to a comparator 17 where it is compared with the third velocity threshold value Vs3, preset as a function of time, supplied from a block 16, and the inflator activation mode is selected based on the result of the comparison. When the second time-integrated value is equal to or larger than the third velocity threshold value (V1'≧Vs3), an instruction is given to the block 19 to output the rapid inflation inflator activation mode signal (K=2); on the other hand, when the second time-integrated value is smaller than the third velocity threshold value (V1'<Vs3), the output is sent to the time comparator 8 and the determination of the moderate inflation mode is held off until the predetermined time ts elapses, as in the case of FIG. 2.

Either activation mode signal is transmitted to the block 15 which, upon receiving the inflator activation signal from the comparator 10, supplies the activation mode signal to the first inflator trigger circuit 21 and/or the second inflator trigger circuit 22, and in accordance with the specified activation mode, the inflators are activated to inflate the air bag 23, as in the case of FIG. 2.

The method of determining the inflator activation mode based on the second time-integrated value V1' will be described with reference to FIGS. 12(A) and 12(B). As is apparent from the figures, in all types of collision, V1' shows higher values than V1 in the early stages of collision. Accordingly, if the third velocity threshold value Vs3 is set at a relatively low value Th7 in the early stage, a gradually increasing value Th8 in the middle stage, and a high value Th9 in the remaining stage, as shown in FIG. 12(B), then in a severe collision such as a high-speed frontal or high-speed oblique collision, the inflator activation mode (K=2) for rapidly inflating the air bag is selected at time t1 or time t2, i.e., at a very early point in time in the collision; here, if the time threshold value ts in the time comparator 8 is set as a value greater than t1 and t2, as shown, the selection of the moderate inflation mode is held off until the time ts. As is apparent from the comparison with FIG. 12(A) shown on the same time scale, if the determination were made based only on the acceleration sensor 1 mounted inside the passenger compartment, it would be difficult to make a correct determination at time ts in the case of the high-speed frontal collision or the high-speed oblique collision, since, in this case, the time ts is the time at which the integrated value is just beginning to rise; on the other hand, if V1' is used, it is clear that a correct discrimination can be made at time ts. It will therefore be understood that if both the inflator activation/non-activation decision and the inflation mode determination were to be made based only on V1, it would take considerable time, making it difficult to make a proper decision or determination at proper time.

Figure 4:
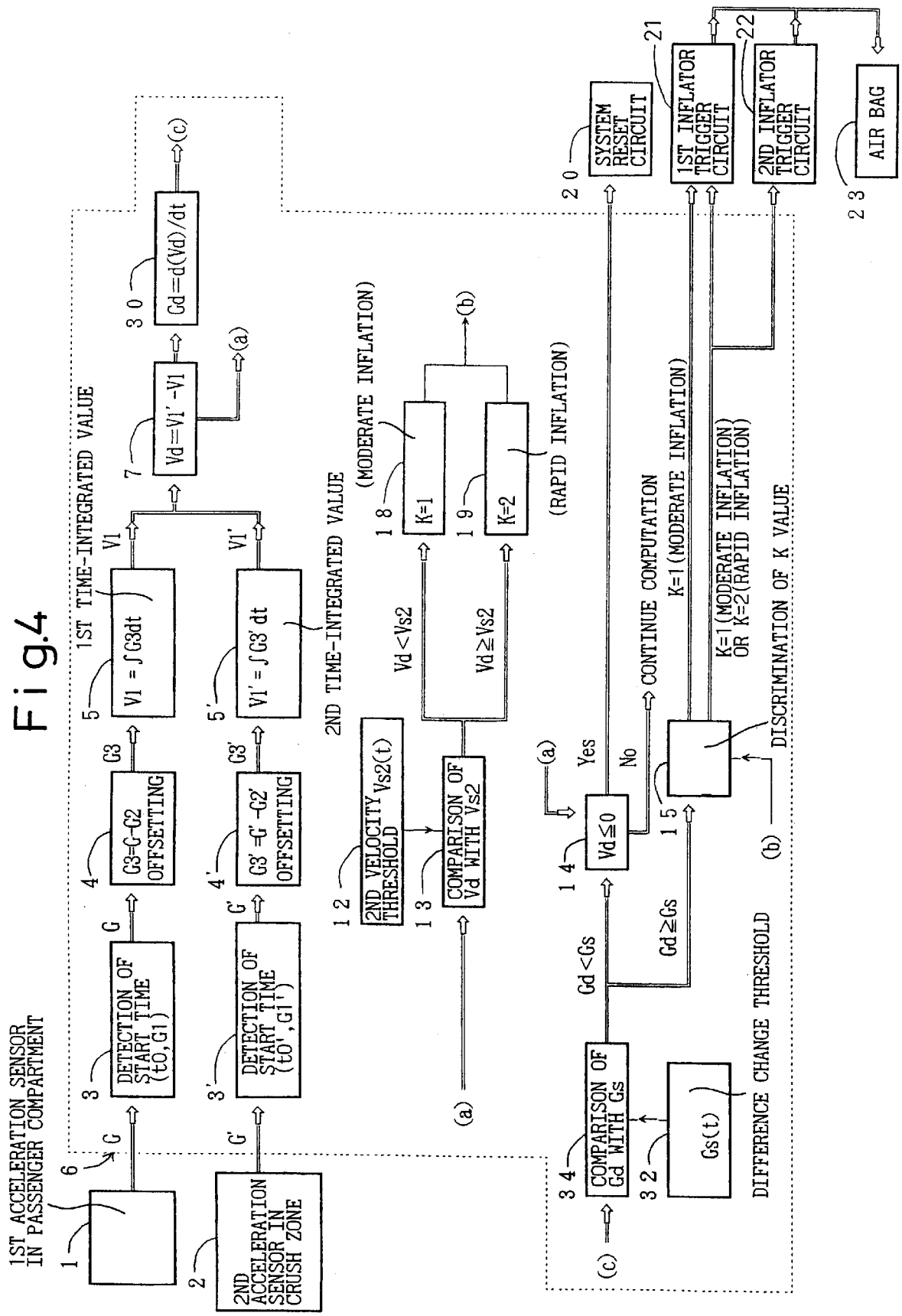
FIGS. 4 to 9 are block diagrams showing other embodiments of the present invention, illustrating alternative examples of inflator activation/non-activation decision making.

FIG. 4 shows another embodiment of the present invention. The difference from FIG. 1 is that the integrated value difference Vd is differentiated in time (d(Vd)/dt) by a differentiator 30 to compute the amount of change, Gd, of Vd, based on which the inflator activation/non-activation decision is made; that is, the amount of change, Gd, of the difference is supplied to a comparator 34 where it is compared with a difference change threshold value Gs preset in a block 32 as a threshold value that varies as a function of time, and a decision whether to activate or not activate the air bag is made based on the result of the comparison. When the amount of change of the difference is equal to or larger than the difference change threshold value (Gd≧Gs), it is determined that inflator activation is needed, and an inflator activation instruction signal is sent to the block 15; then, in accordance with the inflator activation mode signal (K=1 or 2) selected based on the result of the comparison between the integrated value difference Vd and the second velocity threshold value Vs2 in the comparator 13, the block 15 directs the first inflator trigger circuit 21 and/or the second inflator trigger circuit 22 to output the trigger signal, as in the foregoing example. On the other hand, when the difference change amount is smaller than the difference change threshold value (Gd<Gs), the comparator 14 compares Vd with the value preset at or near zero (0); if Vd is not larger than the preset value (for example, not larger than zero), the system is reset by the system reset circuit 20, and if Vd is larger than the preset value (for example, larger than zero), the computation in the computation circuit 6 is continued. This operation is also the same as in the foregoing example.

Figure 14:
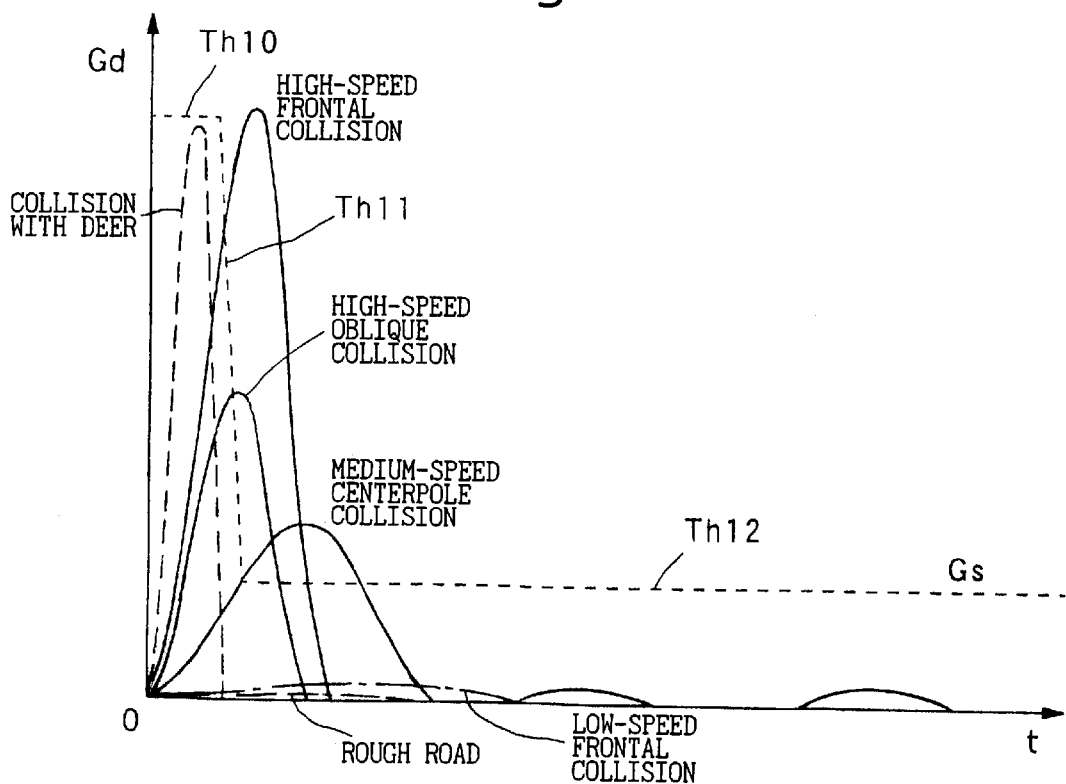
FIG. 14 is a diagram showing the change over time of the amount of change of the integrated value difference.

The relationship between the value Gd and the difference change threshold value Gs as a time function will be described with reference to FIG. 14. FIG. 14 is a diagram showing the relationship between the change of amount, Gd, of the difference and time t in various types of collision. As shown, in the early stages of collision, the threshold value Gs is set at Th10, higher than the level of the deer collision, to prevent an erroneous activation of the air bag in the event of a collision with a deer or the like; the high threshold value Th10 is followed by a rightwardly falling steep threshold value Th11 leading to a low threshold value Th12 and, using the threshold value Th11, a severe collision event such as a high-speed frontal or high-speed oblique collision is discriminated in the early stages to issue an inflator activation command. A medium-speed centerpole collision can be detected in the early part of the low threshold value Th12 so that the medium-speed centerpole collision can also be detected in the early stages. The low threshold value Th12 in the remaining stage is used to decide whether to activate or not activate the air bag in a low-speed frontal collision, and is set at such a value that does not trigger air bag inflation in a collision at a speed lower than a predetermined speed.

The time axis of FIG. 14 is also shown on the same scale as the time axis of the Vd-t diagram of FIG. 13. As can be seen from a comparison between the two figures, when the decision is made based on Gd, the air bag activation command can be issued at an earlier point in time, making it possible to quickly decide to activate the inflators in the event of a severe collision, and allowing a sufficient time margin from the time the activation/non-activation decision is made to the time the inflators are ignited. The advantage of this is that a complex computation can be performed for the determination of the air bag inflation mode. In the case of rough road driving, since the value of Gd remains very small, as in the case of the value of Vd, if the decision is made based on Gd, an erroneous activation of the air bag during rough road driving can be completely prevented, as in the case of using Vd.

In the example of FIG. 4, the determination of the inflator activation mode is made by comparing Vd with the second velocity threshold value Vs2, but it will be appreciated that this can also be accomplished by comparing the second time-integrated value V1' with the third velocity threshold value Vs3 as a time function, as in the example of FIG. 3. Furthermore, in the example of FIG. 4, even when the inflator activation mode is determined to be the moderate inflation mode (K=1), the signal is immediately sent to the block 15, but it will be appreciated that the time comparator 8 and the time threshold value setting device 9 may be included, as shown in FIGS. 2 and 3, so that the determination of the moderate inflation is held off until the predetermined time ts elapses from the time t0' at which the computation based on the second acceleration sensor 2 was started.

Figure 5:
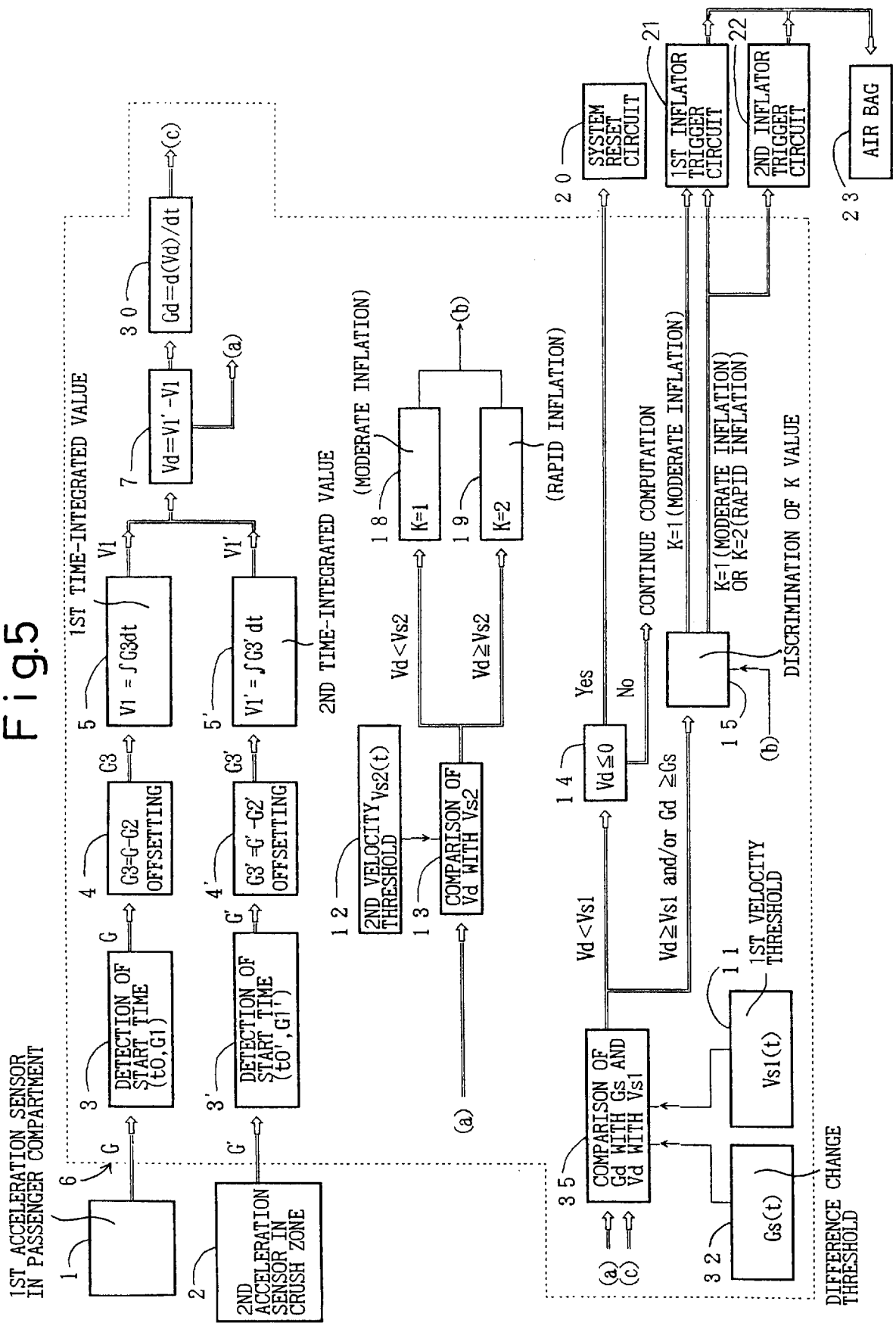

FIG. 5 is a block diagram showing another embodiment of the present invention, in which the inflator activation/non-activation decision process using Vd is added to the method of FIG. 4. That is, the integrated value difference Vd and its amount of change Gd are input to a comparator 35 where they are compared with the first velocity threshold value Vs1 as a time function and the difference change threshold value Gs, respectively, and when either Vd≧Vs1 or Gd≧Gs or both are satisfied, it is determined that inflator activation is needed, and the inflator activation instruction signal is sent to the block 15; then, when the inflator activation mode signal (K=1 or 2), determined based on the result of the comparison between Vd and the second velocity threshold value Vs2 in the comparator 13 as the inflator activation mode determining circuit, is input to the block 15, trigger instruction signals are sent to the first and second inflator trigger circuits 21 and 22 in accordance with the specified activation mode. On the other hand, when the result of the comparison in the comparator 35 shows Vd<Vs1, then Vd is compared with the preset value in the comparator 14 and, depending on the result of the comparison, it is determined whether to reset the system or to continue the computation, as in the case of the foregoing embodiment.

The method that determines that inflator activation is needed when either Vd≧Vs1 or Gd a Gs is satisfied is the same as the method of FIG. 3 or 4, but this has the advantage of making various sensitivity settings possible. Further, the method that activates the inflators only when both conditions are satisfied has the effect of enhancing reliability because the decision is made doubly.

Figure 6:
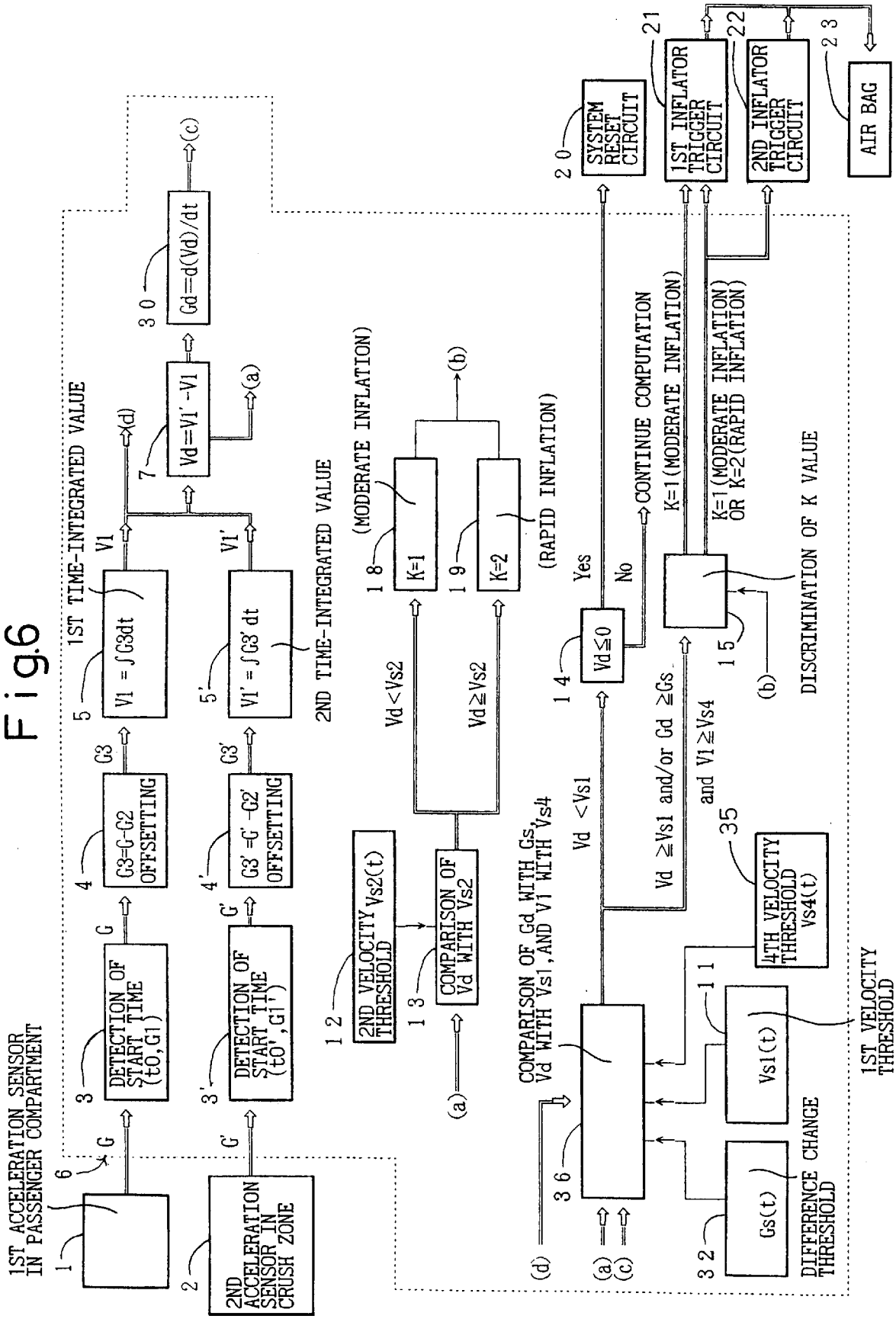

FIG. 6 is a block diagram showing another embodiment of the present invention in which the inflator activation/non-activation decision is made using the first time-integrated value V1 based on the first acceleration sensor 1 in the passenger compartment, in addition to the integrated value difference Vd and the amount of change, Gd, of the integrated value shown in FIG. 5. That is, a comparator 36 not only compares Vd and Gd with their respective threshold values Vs1 and Gs, but also compares the first time-integrated value V1 with a fourth velocity threshold value Vs4 preset in a block 35 as a threshold value that varies as a function of time, and only when at least one of the conditions of Vd≧Vs1 and Gd≧Gs are satisfied, and the condition V1≧Vs4 are satisfied, is an inflator activation permit signal sent to the block 15. When the activation mode signal (K=1 or 2) and the activation permit signal are input, the block 15 sends the trigger signal to the inflator circuits, as in the case of the foregoing embodiment. When Vd<Vs1, the operation is the same as previously described, and therefore, the description will not be repeated here.

The reason that the first time-integrated value V1 is also used when making the decision is that by setting the fourth velocity threshold value Vs4 for the first time-integrated value V1 at a relatively low value, as shown in FIG. 12(A), the decision can, in effect, be made based on Vd and Gd and, at the same time, an erroneous activation due to Vd and Gd can be prevented.

Figure 7:
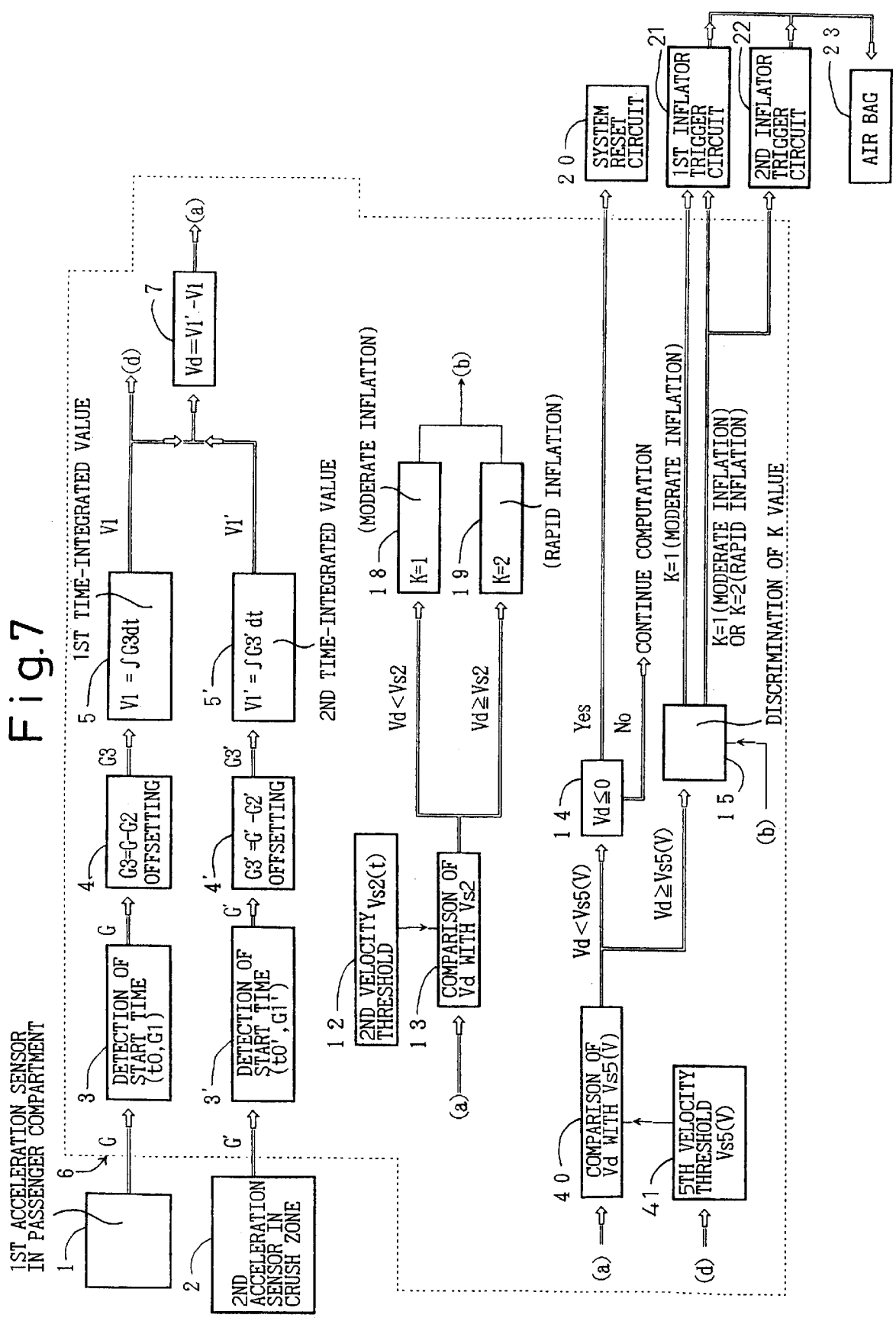

FIG. 7 is a block diagram showing another embodiment of the present invention, illustrating an alternative method of inflator activation/non-activation decision. In the examples of FIGS. 1 to 6, Vd was compared with the threshold value given as a time function, but the feature of the present embodiment is that Vd is compared with a velocity function threshold value defined as a function of the first time-integrated value V1. That is, in FIG. 7, the difference Vd between V1' and V1, obtained in the subtracting means 7, is fed to a comparator 40, while the first time-integrated value V1 is fed to a block 41 which computes a fifth velocity threshold value Vs5 (=f(V1)) preset as a function of the first time-integrated value V1 and supplies the fifth velocity threshold value Vs5 to the comparator 40. The comparator 40 compares the two values and, when the integrated value difference is equal to or larger than the fifth velocity threshold value (Vd≧Vs5), sends an inflator trigger permit signal to the block 15. On the other hand, when the integrated value difference is smaller than the fifth velocity threshold value (Vd<Vs5), Vd is supplied to the comparator 14 where it is compared with a value preset at or near zero (0); when Vd<0 (or the preset value near zero), a signal is sent to the system reset circuit 20 to reset the system, but when Vd≧0 (or the preset value near zero), the computation is continued, as in the case of the foregoing embodiment.

Figure 15:
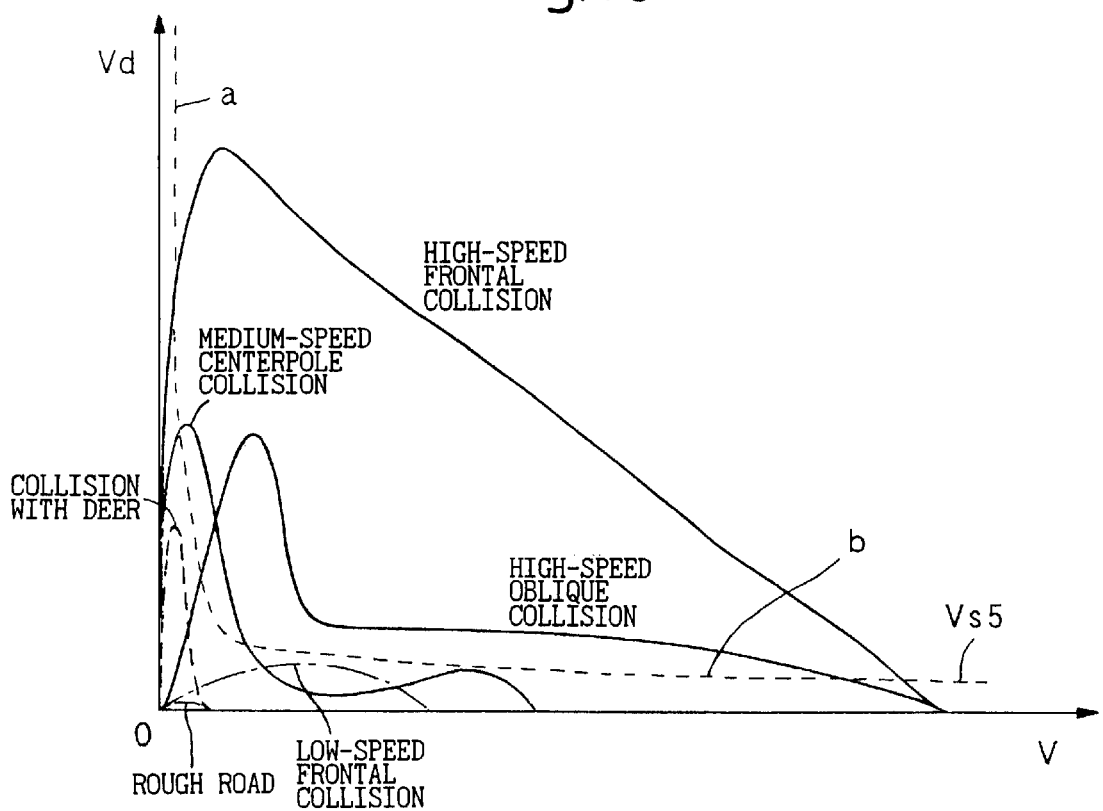
FIG. 15 is a diagram showing the relationship between the integrated value difference and the first time-integrated value.

The comparison between the value Vd and the velocity function threshold value Vs5 in the present embodiment will be described below. FIG. 15 is a diagram showing the relationship between Vd and V1 in various types of collision. As shown, the fifth velocity threshold value Vs5 as a velocity function is hyperbolic in shape; the curve segment a rising along the Vd axis is so set as to be able to discriminate a deer collision, while the minimum value of V1 is set equal to the level of the threshold value Vs4 which is shown as a constant value in FIG. 12(A). On the other hand, the progressively decreasing curve b along the V1 axis is so set as to be able to discriminate a low-speed frontal collision. According to this discrimination method, the threshold value is given, not as a function of time, but as a function of the first time-integrated value V1 so that a stable discrimination result can be obtained independently of time.

Figure 8:
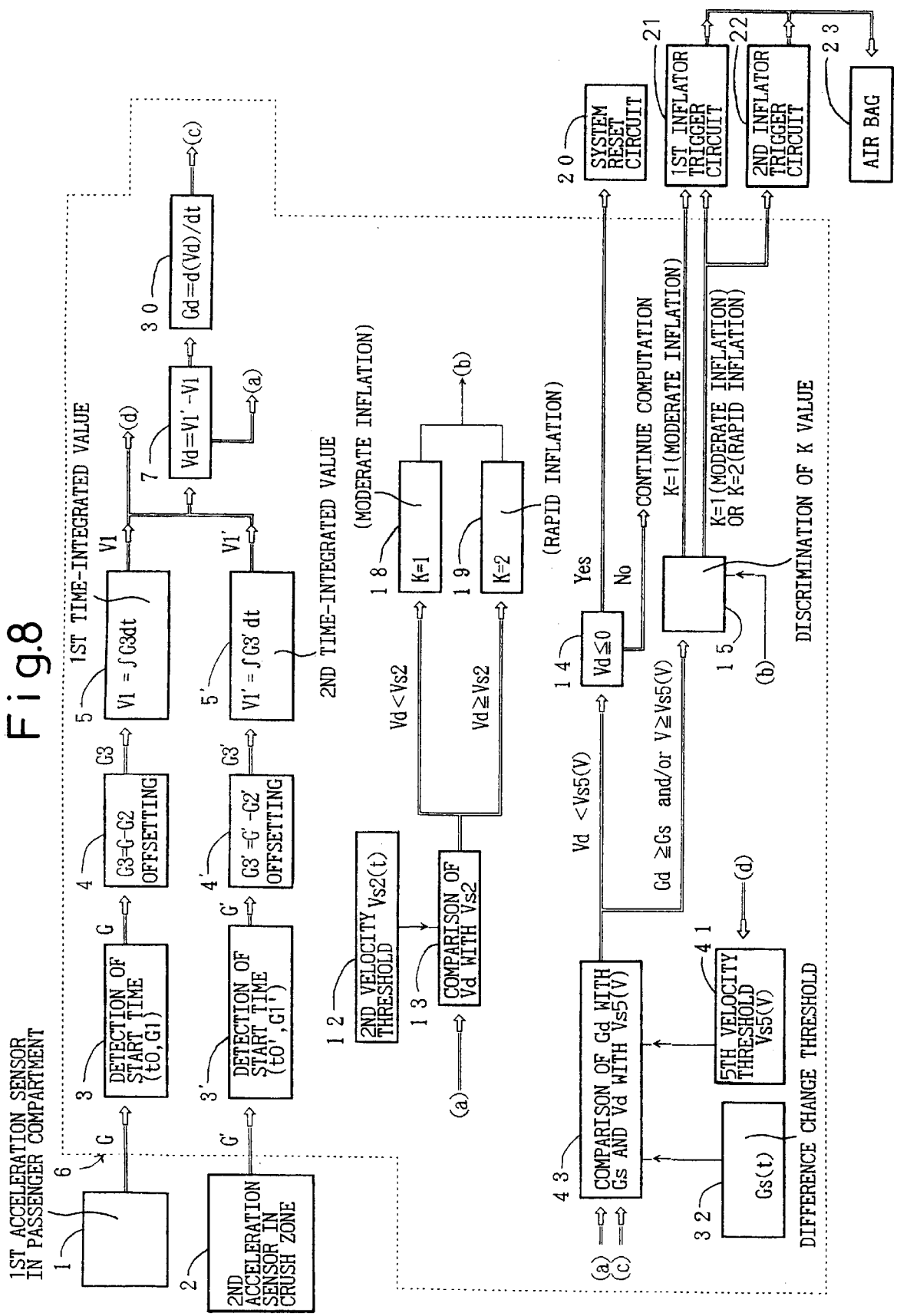

FIG. 8 is a block diagram showing another embodiment of the present invention, in which the inflator activation/non-activation decision is made based on the comparison between the amount of change, Gd, of the integrated value difference and the difference change threshold value Gs, in addition to the comparison between the integrated value difference Vd and the fifth velocity threshold value Vs5 as a velocity function shown in FIG. 7. That is, in FIG. 8, the integrated value difference Vd, the fifth velocity threshold value Vs5, the amount of change, Gd, of the difference, and the difference change threshold value Gs are input to a comparator 43 where the respective comparisons are made, and when either one of the conditions, Vd≧Vs5 or Gd a Gs, or both conditions are satisfied, the inflator trigger permit signal is sent to the block 15. When Vd<Vs5, the system reset circuit 20 is activated to reset the system or the computation is continued, depending on the value of Vd at that time, as in the case of the foregoing embodiment.

In this way, when the comparison between Gd and the difference change threshold value Gs as a time function is used in addition to the fifth velocity threshold value Vs5 given as a velocity function that has stability not dependent on time, the scope of the decision can be enlarged and reliability enhanced. On the other hand, if provisions are made to permit inflator activation only when both conditions are satisfied, since a severe collision event such as a high-speed frontal or high-speed oblique collision can be discriminated in the early stages of collision by comparing Gd with its difference change threshold value Gs, as shown in FIG. 14, a collision discrimination with further enhanced reliability becomes possible since the capability to discriminate the severity of the collision in early stages is combined with the reliability achieved by the use of the velocity function threshold value.

Figure 9:
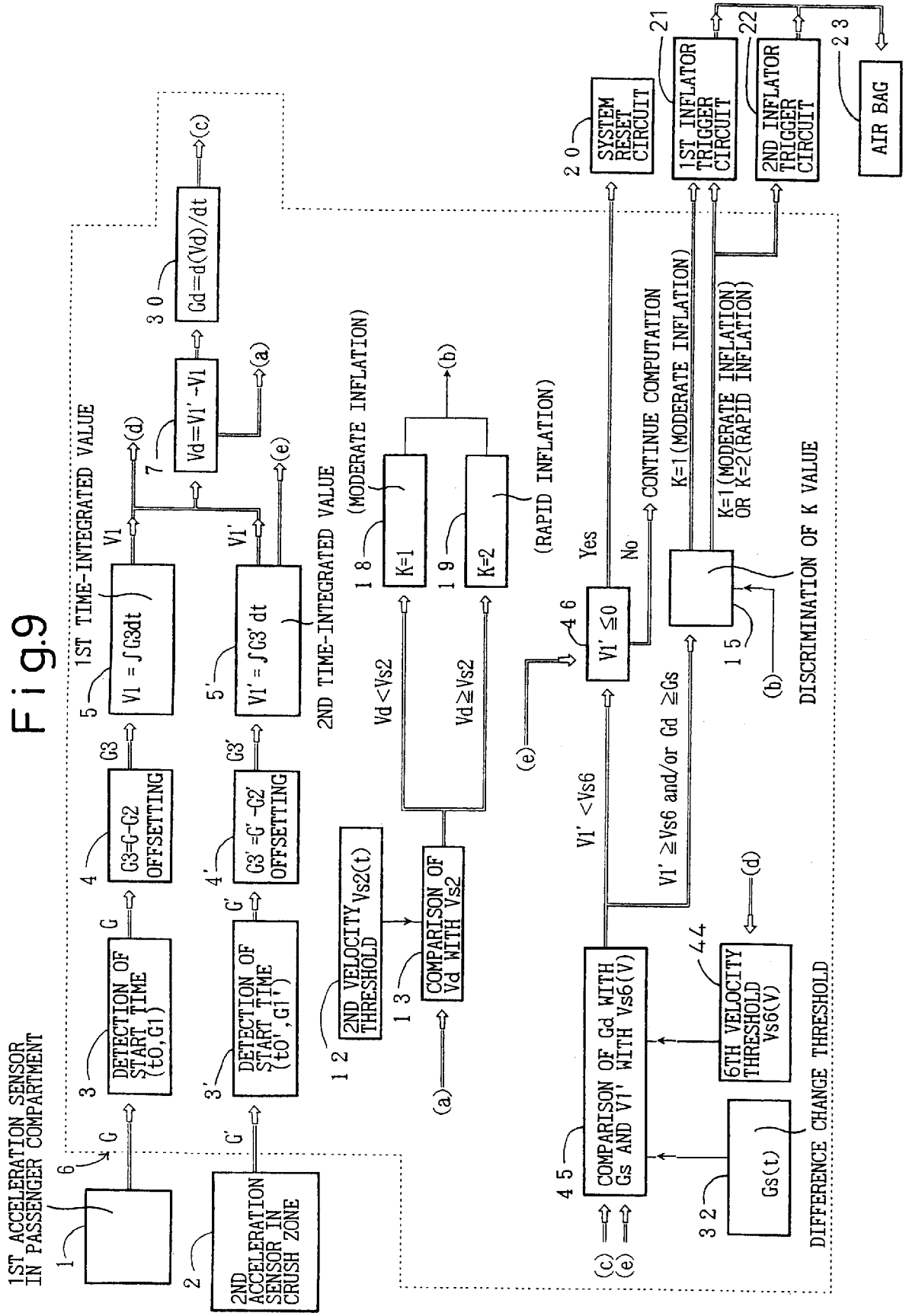

FIG. 9 is a block diagram showing another embodiment of the present invention, illustrating still another example of inflator activation/non-activation decision, in which the second time-integrated value V1' is compared with a sixth velocity threshold value Vs6=(V1)) set as a function of the first time-integrated value V1, rather than comparing the integrated value difference Vd with the fifth velocity threshold value Vs5 as a time function shown in FIG. 8. That is, the first time-integrated value V1 obtained by time integration in the time-integrating means 5 is sent to a block 44 which then computes the sixth velocity threshold value Vs6 preset as a function of the first time-integrated value V1, and supplies it to a comparator 45. The comparator 45 is also supplied with the second time-integrated value V1' from the integrator 5', the amount of change, Gd, of the difference from the block 30, and the difference change threshold value Gs from the block 32, and compares the second time-integrated value V1' with the sixth threshold value Vs6 set as a velocity function and the amount of change, Gd, of the integrated value difference with the threshold value Gs as a time function of Gd, and when either of the two conditions, Gd≧Gs or V1≧Vs6, or both conditions are satisfied, the inflator activation permit signal is sent to the block 15. This also means that the decision whether to activate or not activate the inflators can be made based only on the comparison between V1' and Vs6, but the present embodiment shows the case where the decision is made based on two comparisons, that is, one between Gd and Gs and the other between V1' and Vs6.

As the result of the comparison in the comparator 45, if V1'<Vs6, the value of V1' is sent to a comparator 46 where it is compared with the value preset at or near zero (0); if V1'<0 (or preset value near zero), a signal is sent to the system reset circuit 20 to reset the system, while if V1'≧0 (or preset value near zero), the computation is continued. That is, in FIGS. 1 to 8, the decision whether to reset the system or to continue the computation was made based on the value of Vd at that time, but in the present embodiment, the decision is made based on the value of V1'. Whether to use Vd or V1' is at the designer's discretion, and whichever easier in system design should be chosen. This means that the decision whether to reset the system or to continue the computation can also be made based on the value of Gd at that time.

Figure 16:
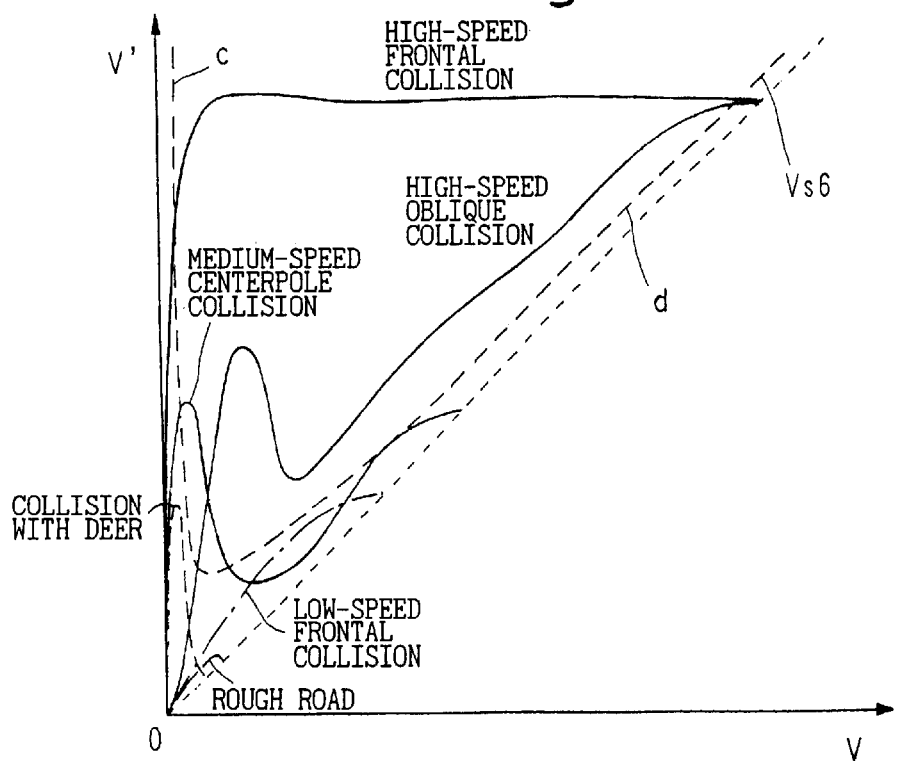
FIG. 16 is a diagram showing the relationship between the second time-integrated value and the first time-integrated value.

Next, the relationship between the value V1' and the threshold value Vs6 as a velocity function of V1' in the present embodiment will be described with reference to FIG. 16. FIG. 16 is a diagram showing the relationship between V1' and V1 in various types of collision. In the figure, the dashed line drawn at 45 degrees to the axes represents V1'=V1, and in each type of collision, the condition V1'=V1 is eventually reached. As can also be seen from FIGS. 12(A) and 12(B), in every collision type, V1' shows a higher value than V1 from the instant of collision, and has the characteristic of approaching V1 as the time elapses; accordingly, all the lines are located above the 45-degree line. Also, the sixth velocity threshold value Vs6 set as a function of V1 is shown in the form of a hyperbolic function of V1 located between the 45-degree line and the V1' axis, and the smallest V1 value on the curve c along the V1' axis is set at a value approximately equal to the level of the threshold value Vs4 shown as a constant value in FIG. 12(A) so that a deer collision can likewise be discriminated. On the other hand, the curve segment d along the 45-degree line is so set as to be able to discriminate a low-speed collision. In this case also, since the threshold value is given, not as a function of time, but as a velocity function of the first time-integrated value V, a stable discrimination independent of time can be achieved, as in the case of the foregoing embodiment that uses the fifth velocity threshold value Vs5.

In the case of FIG. 9, as in the case of FIG. 8, since the discrimination based on the comparison between Gd and the difference change threshold value Gs as a time function is used in combination with the discrimination based on the threshold value Vs6 as a velocity function having stability not dependent on the time, the effect is that the scope of the discrimination is enlarged, enhancing the discrimination capability. On the other hand, if provisions are made to issue activation permit signals to the inflators only when both conditions are satisfied, not only can a severe collision event such as a high-speed frontal or high-speed oblique collision be discriminated in the early stages of collision, but the effect of further enhancing the reliability of collision discrimination can be expected since the capability to discriminate the severity of the collision in early stages is combined with the reliability achieved by the use of the velocity function threshold value.

Figure 10:
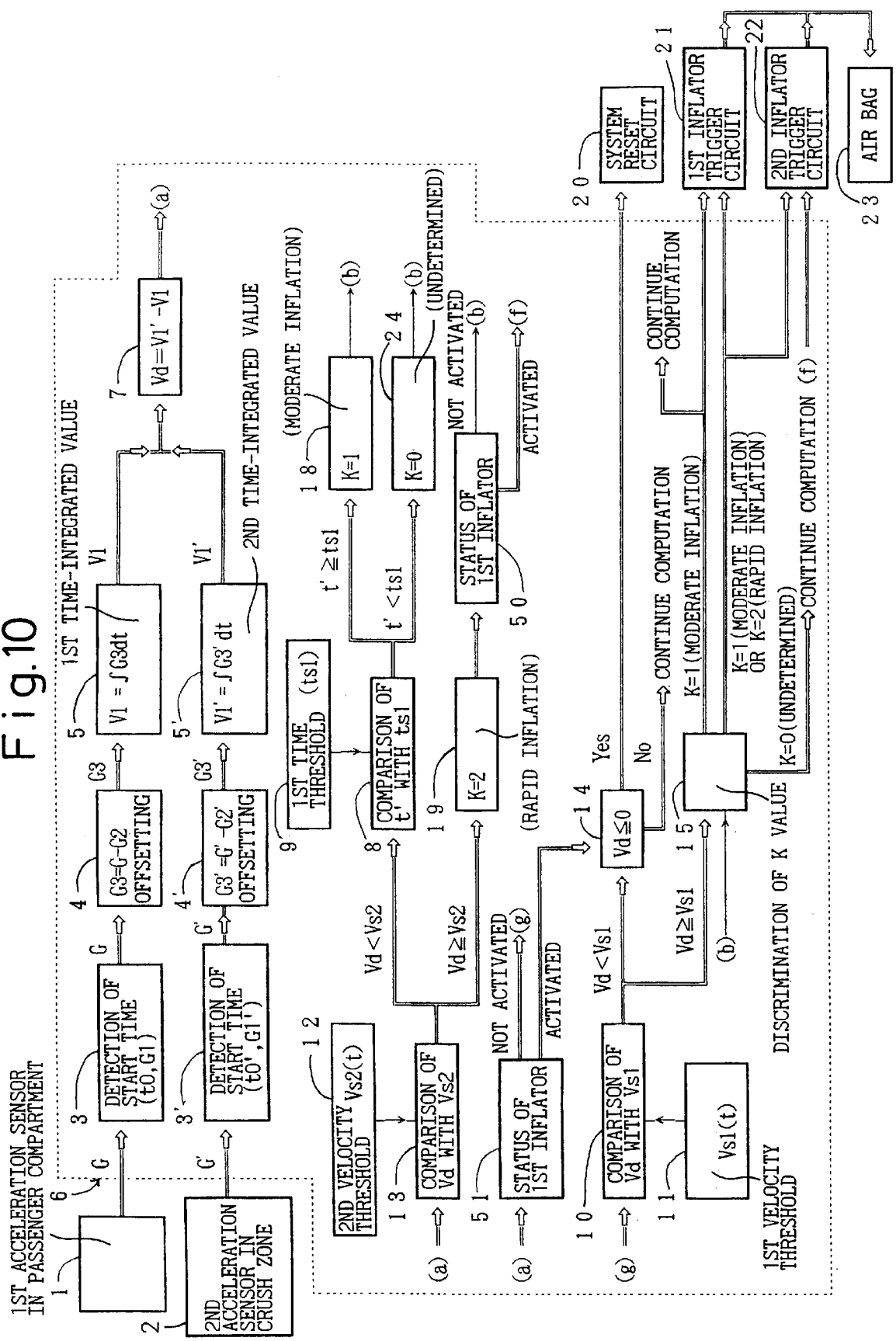
FIG. 10 is a block diagram showing a further embodiment of the present invention, illustrating a further example of the inflator activation mode determination and activation/non-activation decision making.

FIG. 10 is a block diagram showing another embodiment of the present invention, illustrating yet another example of inflator activation/non-activation and inflator activation mode determination. In the examples shown in FIGS. 1 to 9, once the trigger command is issued from the block 15 to the inflator trigger circuits 21 and 22 in accordance with the inflator activation mode (K=1 or 2), the activation mode thus determined can no longer be changed. On the other hand, if too much emphasis is placed on the optimization of the activation mode, there arises the possibility of missing the inflator activation timing. In view of this, in the present embodiment, during the period when the moderate inflation signal K=1 is output as the result of the inflator activation mode determination, if it is determined that inflator activation is needed as the result of the inflator activation/non-activation decision, the first inflator is immediately activated while allowing the computation to continue for the inflator activation mode determination; then, if the activation mode determination changes to the rapid inflation mode as the result of the computation, the second inflator is immediately activated.

More specifically, in FIG. 10, when Vd<Vs2 as the result of the comparison between the integrated value difference Vd and the second velocity threshold value Vs2 in the block 13, the determination of the moderate inflation mode is held off until the predetermined time ts1 elapses, and at the end of the predetermined time ts1, the block 18 outputs the moderate inflation signal K=1 which is sent to the block 15. When t<ts1, the block 24 sends the K value undetermined signal (K=0) to the block 15 which, when K=0 is input, allows the computation to continue, as in the case of FIGS. 2 and 3. On the other hand, in the moderate inflation mode, that is, when the moderate inflation signal K=1 is being applied to the block 15, the inflator activation/non-activation decision system operates as follows: first, a block 51 checks the activation status of the first inflator, and if the first inflator is in a non-activated state, the block 10 compares the integrated value difference Vd with the first velocity threshold value Vs1 to decide whether to activate or not activate the inflator; if it is determined that there is a need to activate the inflator, the resultant signal is sent to the block 15. Since the inflator activation mode is the moderate inflation mode, only the first inflator is activated in accordance with the moderate inflation signal, while allowing the computation to continue for the inflator activation mode determination. As the result of the computation, if Vd≧Vs2 in the block 13, the block 19 outputs the rapid inflation signal (K=2), and a block 50 checks the activation status of the first inflator; here, since the first inflator is already activated, the second inflator is immediately activated.

On the other hand, if Vd≧Vs2 before activating the first inflator, and the rapid inflation signal K=2 is output from the block 19, then since the activation status of the first inflator checked in the block 50 is "not activated", the rapid inflation signal K=2 is sent to the block 15 in the same manner as described above; also, in the inflator activation/non-activation decision making circuit, the activation status of the first inflator checked in the block 51 is "not activated", and therefore, when Vd≧Vs1 as the result of the comparison between the integrated value difference Vd and the first velocity threshold value Vs1 in the block 10, the inflator activation signal is sent to the block 15 so that both the first and second inflators are activated in accordance with the already issued rapid inflation signal in the same manner as earlier described.

As is apparent from the above description, in the methods of FIGS. 1 to 9, the various threshold values must be chosen so that the determination of the inflator activation mode is completed before the decision is made as to whether to activate or not activate the inflators, but it is difficult to satisfy all such conditions for all types of vehicle body structure and all types of collision. Considering that unpredictable situations can happen, it can be said that the method of the present embodiment that waits the decision to switch or not switch to the rapid inflation mode until the last moment after activating the inflator for moderate inflation, not fixing the inflator activation mode once determined, is a versatile method that can be applied to extensive types of body structure and a variety of collision types.

Figure 11:
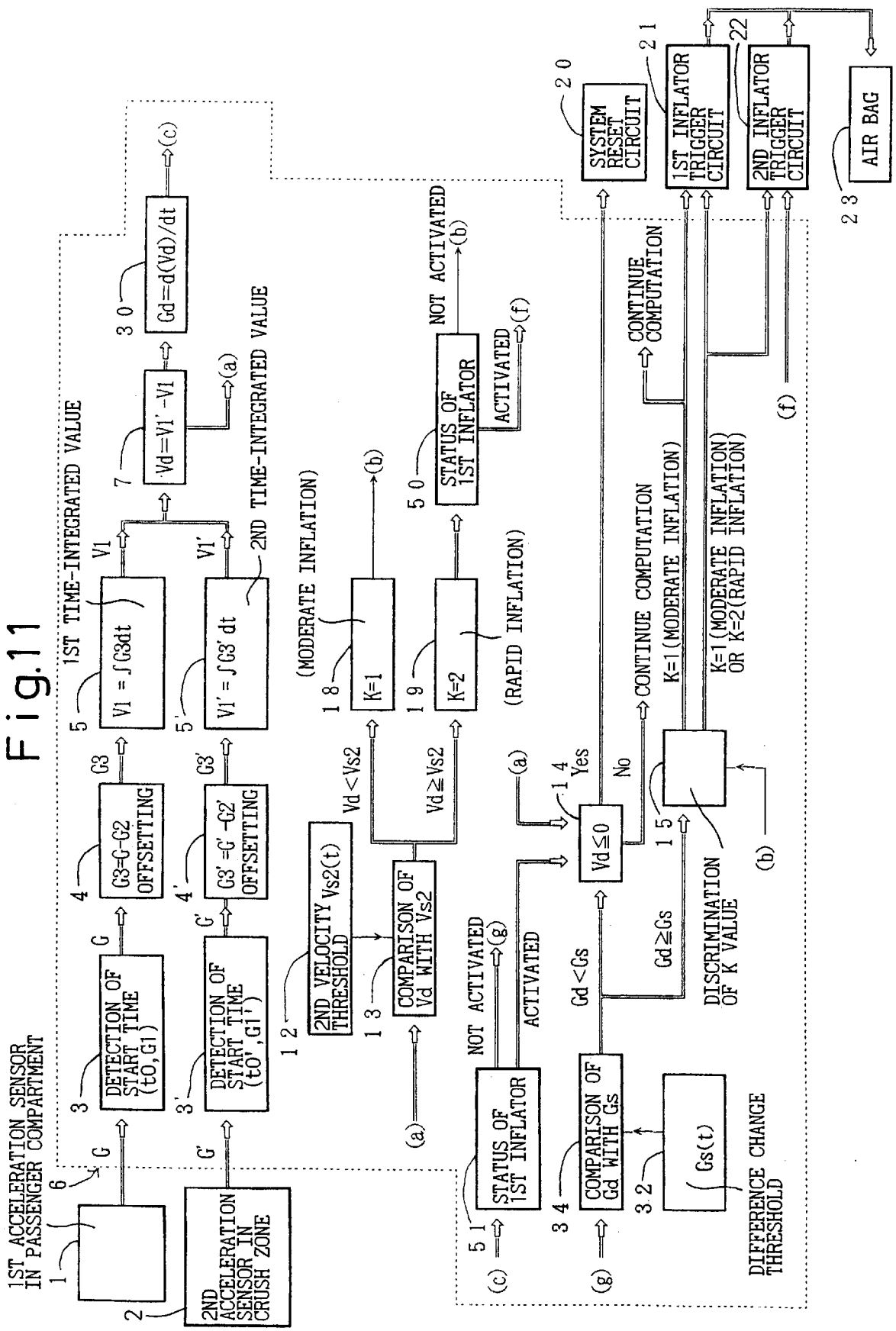
FIG. 11 is a block diagram showing a modified example of FIG. 10.

FIG. 11 is a block diagram showing a modified example of the embodiment of FIG. 10. Differences from FIG. 10 are that the inflator activation/non-activation decision is made by comparing the amount of change, Gd, of the integrated value difference with its threshold value Gs, and that the blocks 8 and 9 are omitted that were used in FIG. 10 to hold off the determination of the moderate inflation mode until the predetermined time elapses after the start of the computation based on the second acceleration sensor. In other respects, the configuration is the same as that of FIG. 10; that is, as in the case of FIG. 10, when it is determined that there is a need to activate the inflator in the moderate inflation mode, the first inflator is immediately activated while allowing the computation to continue for the inflator activation mode determination, and when the inflator activation mode switches to the rapid inflation mode as the result of the computation, the second inflator is immediately activated.

As described so far, in the above-described embodiments, the second acceleration sensor is mounted in the crush zone to supplement the first acceleration sensor mounted, as in a conventional system, in the passenger compartment, the most notable feature being that the decision to activate or not activate the inflators and the determination of the inflator activation mode are made based on the differences in characteristics among the integrated values, the difference between the integrated values, the amount of change of the integrated value difference, etc. Arising from the differences between the acceleration values detected by the respective sensors in various types of collision. Specific implementations of the method have been described with reference to FIGS. 1 to 11, but it will be appreciated that the present invention is not limited to the illustrated examples, but that various other modifications are possible without departing from the spirit and scope of the present invention.

For example, the first to fourth velocity threshold values Vs1 to Vs4, each provided as a threshold value varying as a function of time, may include a constant-value threshold value as a special case of the time function, and the difference change threshold value Gs, also given as a function of time, may likewise include a constant-value threshold value. Furthermore, the time function threshold values Vs3, Vs1, and Gs, given in FIGS. 12(B), 13, and 14 and each shown as consisting of three straight line segments, can each be represented by a curved line varying as a function of time; conversely, the velocity threshold values Vs5 and Vs6 given in FIGS. 15 and 16, each shown as a curve varying as a function of the first time-integrated value V1, can each be replaced by a combination of straight lines representing the function of V1.

In the examples of FIGS. 4 to 11, the inflator activation mode is determined by comparing Vd with the threshold value Vs2 as a time function of Vd, but this can also be accomplished by comparing the second time-integrated value V1' with the third velocity threshold value Vs3, a time function of V1', as practiced in the example of FIG. 3. Further, in the examples of FIGS. 4 to 9 and 11, when the result of the inflator activation mode determination shows moderate inflation (K=1), the corresponding signal is immediately sent to the block 15, but instead, as shown in FIGS. 2, 3, and 10, provisions may be made so that, when the result of the inflator activation mode determination satisfies the moderate inflation condition, the decision is held off and the computation is continued until the predetermined time ts1 elapses from the starting time t0' of the computation based on the second acceleration sensor 2, and upon the expiration of the predetermined time the moderate inflation signal (K=1) is output, thereby enhancing the reliability of the inflator activation mode determination. Furthermore, rather than arranging this time-judging circuit between the inflator activation mode determining means 13 or 17 and the moderate inflation setting device 18, as shown in FIGS. 2, 3, and 10, the time-judging circuit may be arranged, for example, between the K value discriminating circuit 15 and the first inflator trigger circuit 21 so that the output of the first inflator trigger signal for moderate inflation is held off until the predetermined time elapses. The only requirement here is that the inflator activation by the moderate inflation signal be held off until the predetermined time ts elapses, and the same effect can be achieved as long as this requirement is satisfied.

Figure 17:
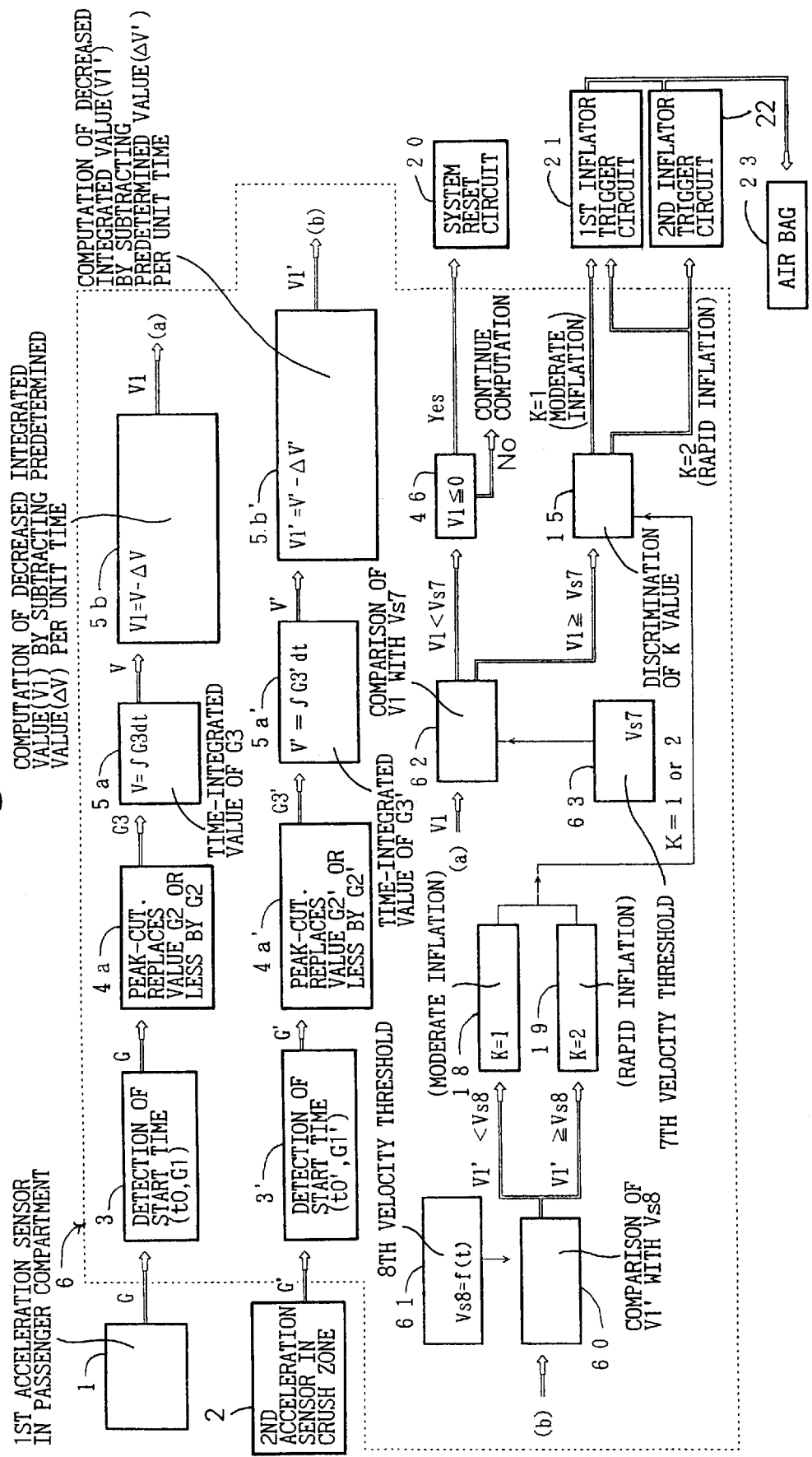
FIG. 17 is a block diagram showing an embodiment according to the second method of the present invention.

Next, the second method of the present invention will be described. In this method, the determination of the air bag inflation mode and the decision whether to activate or not activate the inflators are made based on the differences in characteristics between the first time-integrated value V1 and second time-integrated value V1' obtained by performing time integration based on the acceleration signals supplied from the first acceleration sensor 1 and second acceleration sensor 2. FIG. 17 shows a typical block diagram, in which the same constituent elements as those in FIGS. 1 to 11 are designated by the same reference numerals, and detailed descriptions of such elements will not be repeated here. To describe the computation circuit 6 shown here, the block 3 detects the time t0 at which the acceleration value G detected by the first acceleration sensor 1 mounted inside the passenger compartment exceeds the predetermined acceleration G1, and the computation for collision discrimination is started at this time t0. A block 4a is a peak-cut means which computes acceleration G3 greater than predetermined acceleration G2 by cutting any acceleration values G after the computation starting time t0 that are not greater than G2 (acceleration not greater than G2 is assumed to be G2). Next, a time integrating means 5a integrates the acceleration G3 over time to compute the time-integrated value V, and the velocity subtracting means 5b that follows subtracts a predetermined velocity change value $\Delta V$ per unit time from the time-integrated value V, as needed, to compute the first time-integrated value V1 as a decreased integrated value. The velocity change value $\Delta V$ may be a constant value or a value of a time function.

Here, the peak-cut means in the block 4a and the velocity subtracting means in the block 5b provide means for distinctly discriminating between a high-speed oblique collision and a low-speed frontal collision, as described in detail in Japanese Patent No. 2543839 and Unexamined Patent Publication No. 4-321455, and correspond to the offsetting means in the block 4 shown in FIGS. 1 to 11. Accordingly, the blocks 3 to 5b in FIG. 17 provide the same effect as that of the blocks 3 to 5 in FIGS. 1 to 11, and it will therefore be recognized that either configuration can be used.

On the other hand, the acceleration signal G' detected by the second acceleration sensor 2 mounted in the crush zone is sent to the block 3' which detects the time t0' at which the acceleration signal G' exceeds the predetermined acceleration G1', upon which the computation for the air bag inflation control is started. A block 4a' is a peak-cut means which computes acceleration G3' greater than predetermined acceleration G2' by cutting any acceleration value values G' after the time t0' that are not greater than G2' (acceleration not greater than G2' is assumed to be G2'). Next, a time integrating means 5a' integrates the acceleration G3' over time to compute the time-integrated value V', and the velocity subtracting means 5b' that follows subtracts a predetermined velocity change value ΔV' per unit time from the time-integrated value V', as needed, to compute the second time-integrated value V1' as a decreased integrated value. The velocity change value ΔV' may be a constant value or a value of a time function.

Here, the peak-cut means in the block 4a' and the velocity subtracting means in the block 5b' correspond to the offsetting means in the block 4' shown in FIGS. 1 to 11, as noted above. Accordingly, the blocks 3' to Sb' in FIG. 17 provide the same effect as that of the blocks 3' to 5' in FIGS. 1 to 11, and either configuration may be used, as described above.

The differences in characteristics between the first time-integrated value V1 based on the acceleration signal G from the first acceleration sensor 1 and the second time-integrated value V1' based on the acceleration signal G' from the second acceleration sensor 2 are as previously described with reference to FIG. 12; the same description will not be repeated here, but the differences can be summarized as follows:

(a) In a collision event such as a high-speed frontal or high-speed oblique collision or a medium-speed centerpole collision, that requires air bag inflation, the waveform of the second time-integrated value V1' rises quickly in the early stages of collision, compared with the waveform of the first time-integrated value V1.

(b) Of the collision types that do not require air bag inflation, the low-speed frontal collision is low in severity, causing deformation only to the bumper at the front end of the vehicle; as a result, there occurs no appreciable difference between the two waveforms.

(c) In the case of rough road driving, since no deformation is caused to the crush zone, the two waveforms are substantially the same.

(d) In the case of a deer collision, the crush zone suffers minor deformation, but since the vehicle hits the animal away from it at the instant of the collision, the deformation lasts only briefly; as a result, while the second time-integrated value V1' exhibits a large value momentarily, the first time-integrated value V1 shows only a slight variation.

In view of the above-described characteristics of the first and second time-integrated values V1 and V1', if provisions are made to select the inflation mode of the air bag system by discriminating the severity of the collision in the very early stages of collision based on the second time-integrated value V1' that is sensitive to the severity of the collision, and to decide whether to inflate or not inflate the air bag based on the first time-integrated value V1 that shows the condition within the passenger compartment, then the degree of the collision severity can be determined in the early stages of collision, allowing a time margin for the subsequent computation of the air bag inflation mode; since the computation of the inflation mode is completed by the time it is determined that air bag inflation is needed, the air bag can be immediately inflated without any time delay due to the computation for the inflation mode control.

Next, a detailed description of the computation will be given with reference to FIG. 17. First, the second time-integrated value V1' (either the time-integrated value V' before the subtraction or the decreased integrated value V1' obtained by subtracting ΔV' from it may be used, but in the following description, the value is represented by V1' unless otherwise stated) is fed to a comparator 60 where the value is compared with an eighth velocity threshold value Vs8 preset in a block 61 as a time function representing collision severity, and when the second time-integrated value V1' is smaller than the eighth velocity threshold value Vs8 (V1'<Vs8), it is determined that the collision is not so severe, and the moderate inflation signal (K=1) for inflating the air bag at a moderate speed is output from the block 18; on the other hand, when the second time-integrated value V1' is equal to or larger than the eighth velocity threshold value Vs8 (V1'≧Vs8), it is determined that the collision is severe, and the rapid inflation signal (K=2) for rapidly inflating the air bag is output from the block 19. The eighth velocity threshold value Vs8 may be set as a constant value, or may be given as a time function Vs8(t), like Vs3 shown in FIG. 12(b), in which case the same value as Vs3 may be used.

Next, the first time-integrated value V1 (either the time-integrated value V before the subtraction or the decreased integrated value V1 obtained by subtracting ΔV from it may be used, but in the following description, the value is represented by V1 unless otherwise stated) is compared in a block 62 with a seventh threshold value Vs7 given as a time function, and when V1<Vs7, the resultant signal is sent to the comparator 46; if V1 is equal to or smaller than the value preset at or near zero (V1≧0), a signal is sent to the system reset circuit 20 to stop the computation, otherwise (V1>0) the computation is continued. On the other hand, when V1≧Vs7, it is determined that air bag inflation is needed, and the signal is sent to the block 15 which, based on the air bag inflation mode determining signal (K=1 or K=2) input to it from the block 18 or 19, issues a trigger signal to the inflator(s). More specifically, when the air bag inflation mode is the moderate inflation mode (K=1), the trigger signal is sent from the first inflator trigger circuit 21 to the first inflator to ignite only the first inflator, thereby inflating the air bag 23 at a moderate speed. On the other hand, in the case of the rapid inflation mode (K=2), the trigger signal is issued to both the first inflator trigger circuit 21 and the second inflator trigger circuit 22 to ignite the two inflators together, thereby rapidly inflating the air bag 23. Here, the block 15 is configured to issue the trigger signal to the inflator trigger circuit(s) 21, 22 only when both the inflator activation signal from the comparator 62 and the inflator activation mode signal from the block 18 or 19 are input, and not to issue the trigger signal when only one or the other of the signals is input. This arrangement is the same as that in the previously described configuration.

In the moderate inflation mode (K=1) described above, it is also possible to activate both the first and second inflators by displacing the ignition timing between them; in this case, in the rapid inflation mode (K=2), the two inflators are activated either simultaneously or by displacing the ignition timing only slightly. One way to ignite the inflators by displacing the ignition timing is to preset ignition timings appropriate to the slow and rapid inflation modes, respectively, and to ignite the inflators with the preset timing difference. Alternatively, the ignition timing difference may be determined based on the time, after the starting of the computation, at which the first time-integrated value V1 exceeds the seventh velocity threshold value Vs7, the time function, when V1 is compared with Vs7 in the block 62; that is, when V1 exceeded Vs7 in the very early stages of collision, this means a severe collision and, therefore, the ignition timing difference between the inflators is made small, and when V1 exceeded Vs7 in relatively early stages after that, the inflators are ignited with a slightly larger time difference, for example, with a time difference of a few milliseconds.

Figure 18:
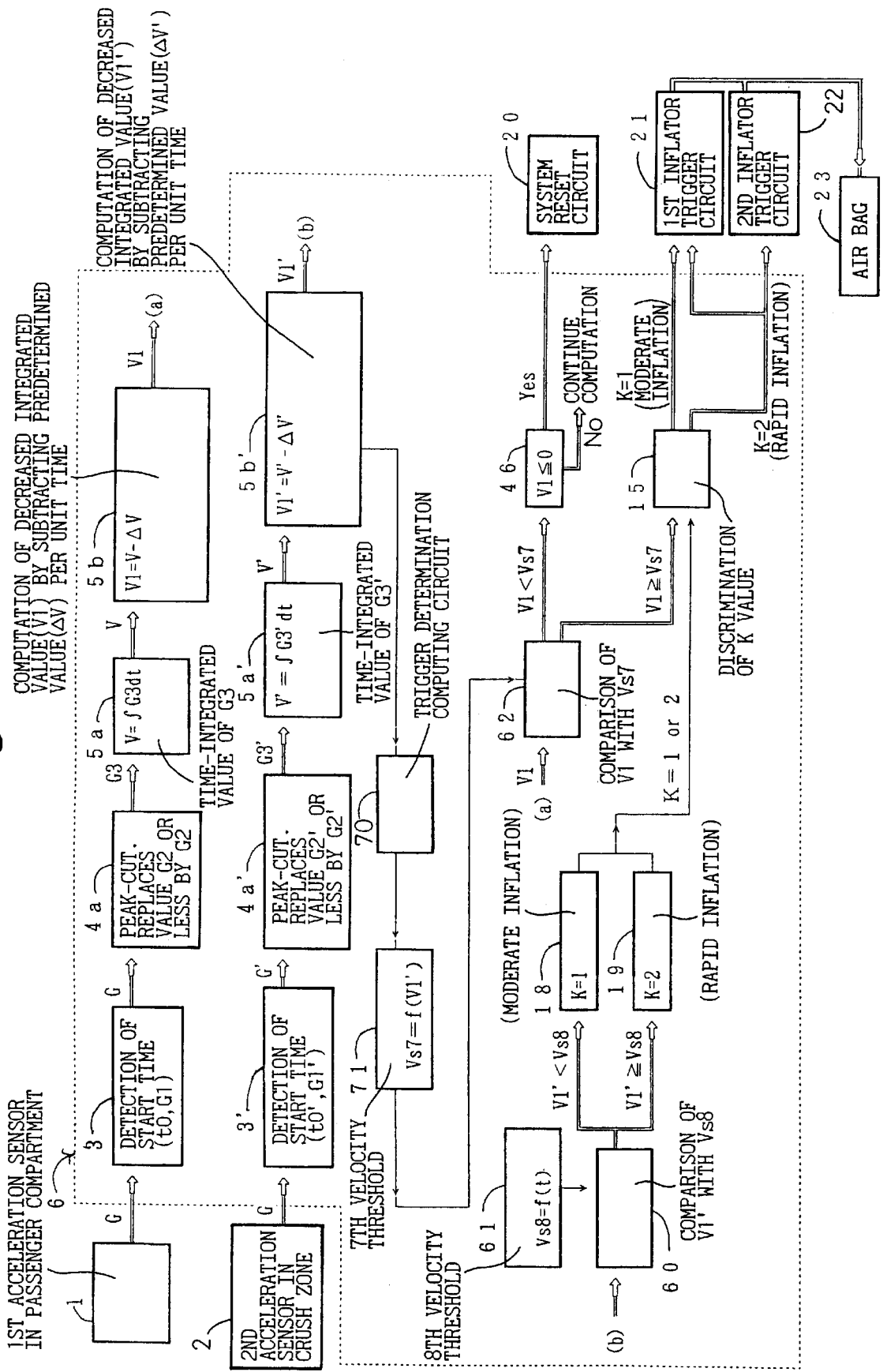
FIGS. 18 to 24 are block diagrams each showing a modified example of the method shown in FIG. 17.

FIG. 18 shows another embodiment of the present invention, wherein the same constituent elements as those in FIG. 17 are designated by the reference numerals. In the configuration shown here, the second time-integrated value V1' obtained in the subtracting means 5b' is input to an inflator trigger determination computing circuit 70 which, based on the second time-integrated value V1', makes a first decision as to whether to activate or not activate the inflators; then, based on the result of this decision, the value of the seventh velocity threshold value Vs7 in the block 71 is varied, and this varied seventh velocity threshold value Vs7 is input to the comparator 62 for comparison with the first time-integrated value V1.

More specifically, since the crush zone is the first part that is damaged in the event of a collision, the acceleration detected by the second acceleration sensor 2 settles down earlier than the acceleration detected by the first acceleration sensor 1 mounted, as in a conventional system, inside the passenger compartment, as can be seen from FIG. 12. Therefore, if the decision as to whether to activate or not activate the inflators is made based on the acceleration signal from the second acceleration sensor 2, the activation/non-activation decision can be made earlier than would be possible if the decision were made based on the signal from the first acceleration sensor mounted, as in a conventional system, inside the passenger compartment. In view of this, in the present embodiment, the first decision as to whether to activate or not activate the air bag system is made in the block 70 by using the second time-integrated value V1' computed based on the change of the acceleration detected by the second acceleration sensor 2. Various systems (algorithms) proposed in the art and implemented in practice for making such decisions using an acceleration signal from a passenger compartment acceleration sensor can be used for the decision making circuit in the block 70; though not specifically limited, it is preferable to use the algorithm previously proposed by the applicant of the present invention and implemented in practice (the algorithm described, for example, in Japanese Patent No. 2543839 and Unexamined Patent Publication No. 3-253441).

Next, when it is determined that inflator activation is needed as the result of the first decision in the block 70, the value of the seventh velocity threshold value Vs7 to be input to the comparator 62 is set at a relatively low value in the block 71, but when it is determined that inflator activation is not needed, on the other hand, the value of the seventh velocity threshold value Vs7 is set at a relatively high value; further, if, in the block 70, it is determined in early stages that inflator activation is needed, the value of Vs7 is set at an extremely low value. In this way, the seventh velocity threshold value Vs7 is set as a value that varies as a function of the second time-integrated value V1', that is, Vs7=f(V1').

The comparator 62 compares the first time-integrated value V1 with the seventh velocity threshold value Vs7, and when V1≧Vs7, the first inflator and/or the second inflator are ignited in accordance with the K value supplied as a slow/rapid inflation indicator to the block 15, as in the case of FIG. 17.

Figure 19:
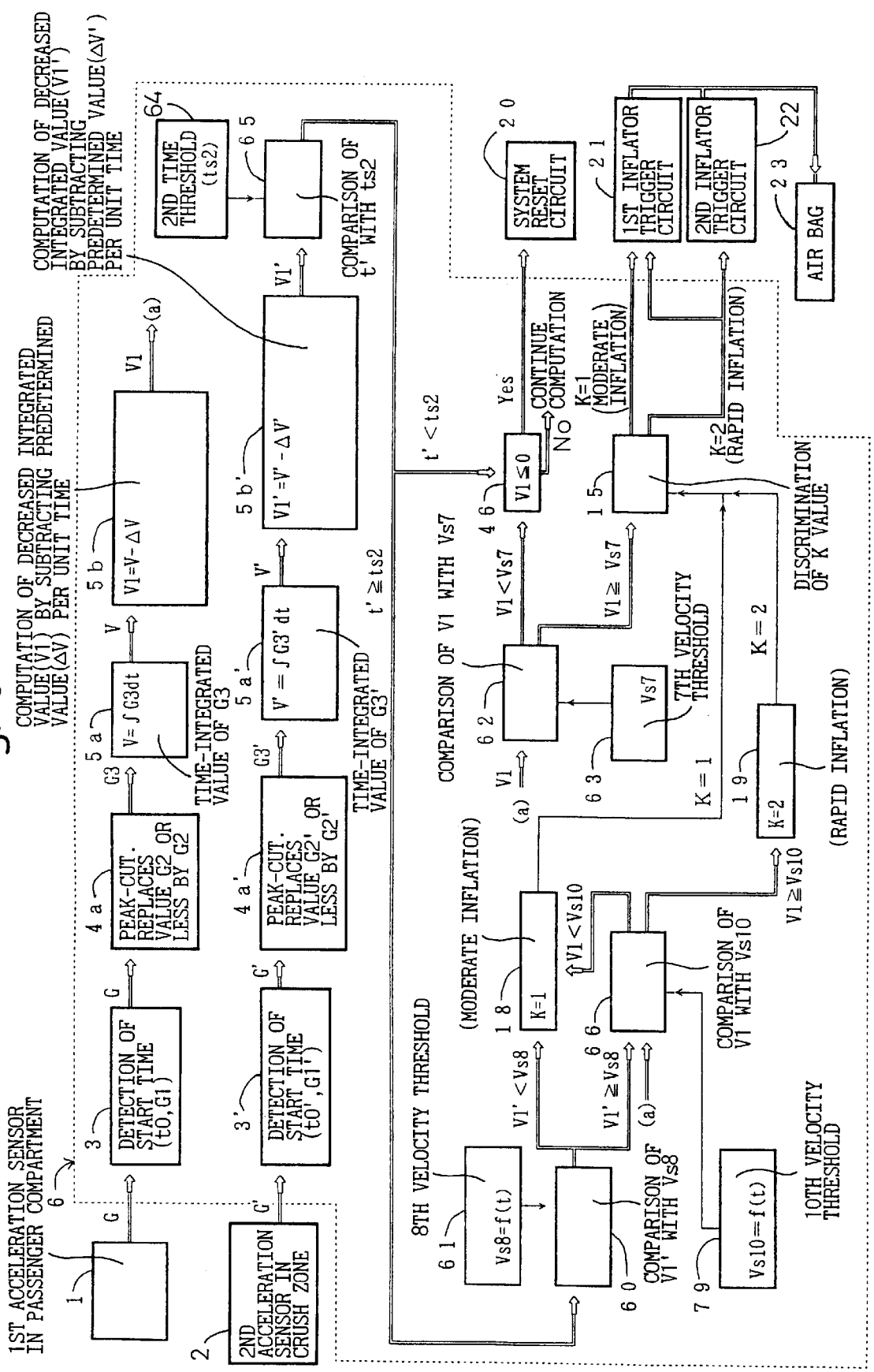

FIG. 19 shows a modified example of FIG. 17, wherein the same constituent elements as those in FIG. 17 are designated by the same reference numerals and will not be described in detail here. In the case of FIG. 17, since the second time-integrated value V1' is constantly compared with the eight velocity threshold value Vs8 used to judge the severity of the collision, in the case of a high-speed oblique collision the degree of the collision severity is determined in the very early stages of the collision, as can be seen from FIG. 12(b). In the case of a very high-speed collision, this means that the determination is made at a much earlier point in time, and depending on the situation, the result of the determination may lack stability. Furthermore, in situations where the second acceleration sensor 2 is hit directly by a thin pole or projection in a low-speed collision, or where the vehicle body on which the acceleration sensor 2 is mounted hits the ground during rough road driving, exerting a large acceleration to the sensor 2, there occurs the possibility that the situation may be judged as being a severe collision when it is actually a collision of minor severity that does not require air bag inflation.

FIG. 19 shows the method that solves the above problems. In the computation circuit for performing the computation based on the acceleration signal from the second acceleration sensor 2, before the inflator activation mode is determined in the block 60 based on the second time-integrated value V1', the elapsed time t' from the starting of the computation is compared in a time comparator 65 with a second time threshold value ts2preset in a block 64, and when t'<ts2, the inflator activation mode determination by the comparator 60 is held off. That is, even when the computation based on the acceleration sensor 2 is started, the signal for the inflator activation mode determination is not sent to the comparator 60 but the computation is continued until the predetermined second time threshold value ts2 is reached. Since the inflator activation mode determination is not made in the very early stages of collision, this arrangement serves to prevent a collision that causes an input of a large abrupt acceleration, as described above, or an impact applied during rough road driving, from being erroneously judged as being a severe collision, and thus the stability of the collision severity discrimination is increased.

On the other hand, when it is determined in the time comparator 65 that t'≧ts2 (predetermined time has elapsed), the second time-integrated value V1' is sent to the comparator 60 for comparison with the eighth velocity threshold value Vs8; here, the slow or rapid inflation K value may be set in the block 18 or 19 based on the result of the comparison, as in the case of FIG. 17, but in the present embodiment, an additional step is included in the activation mode determination process. That is, when V1'<Vs8, the result is sent to the block 18 to set the air bag inflation mode signal to moderate inflation (K=1), as in the foregoing example, but when V1'≧Vs8, the result is sent to a comparator 66 where the first time-integrated value V1 is further compared with a 10th velocity threshold value Vs10 preset in a block 79 as a time function, based on which result the activation mode is determined. When V1<Vs10 in the comparator 66, the event is determined to be a relatively minor collision, and the result is sent to the block 18 to set the air bag inflation mode signal to moderate inflation (K=1), but when V1≧Vs10, the result is sent to the block 19 to set the air bag inflation mode signal to rapid inflation (K=2). This arrangement prevents the rapid air bag inflation mode from being selected due to a localized impact to the crush zone, thus minimizing the risk of occupant injury due to a rapid inflation of the air bag. The second time threshold value ts2 may be set at the same value as the first time threshold value ts1 previously explained in the examples of FIGS. 2, 3, and 10.

Next, in the comparator 62, the first time-integrated value V1 is compared with the seventh velocity threshold value Vs7 to decide whether to activate or not activate the inflators, as in the foregoing example, and when it is determined that inflator activation is needed (V1≧Vs7), the inflator activation signal is sent to the block 15 which, when both the inflator activation signal and the inflator activation mode signal from the block 18 or 19 are input, issues the trigger signal to the inflator trigger circuit(s) 21, 22, as in the foregoing example.

In this way, the inflator activation mode is determined using the second time-integrated value V1' in conjunction with the first time-integrated value V1; this prevents an erroneous determination from being made in such situations as bottom hitting over a rough road that causes a large acceleration change only in the second time-integrated value or a low-speed collision against a thin pole that causes a localized deformation to the acceleration sensor mounting part. The effect of this is improved stability in the inflator activation mode determination.

Figure 20:
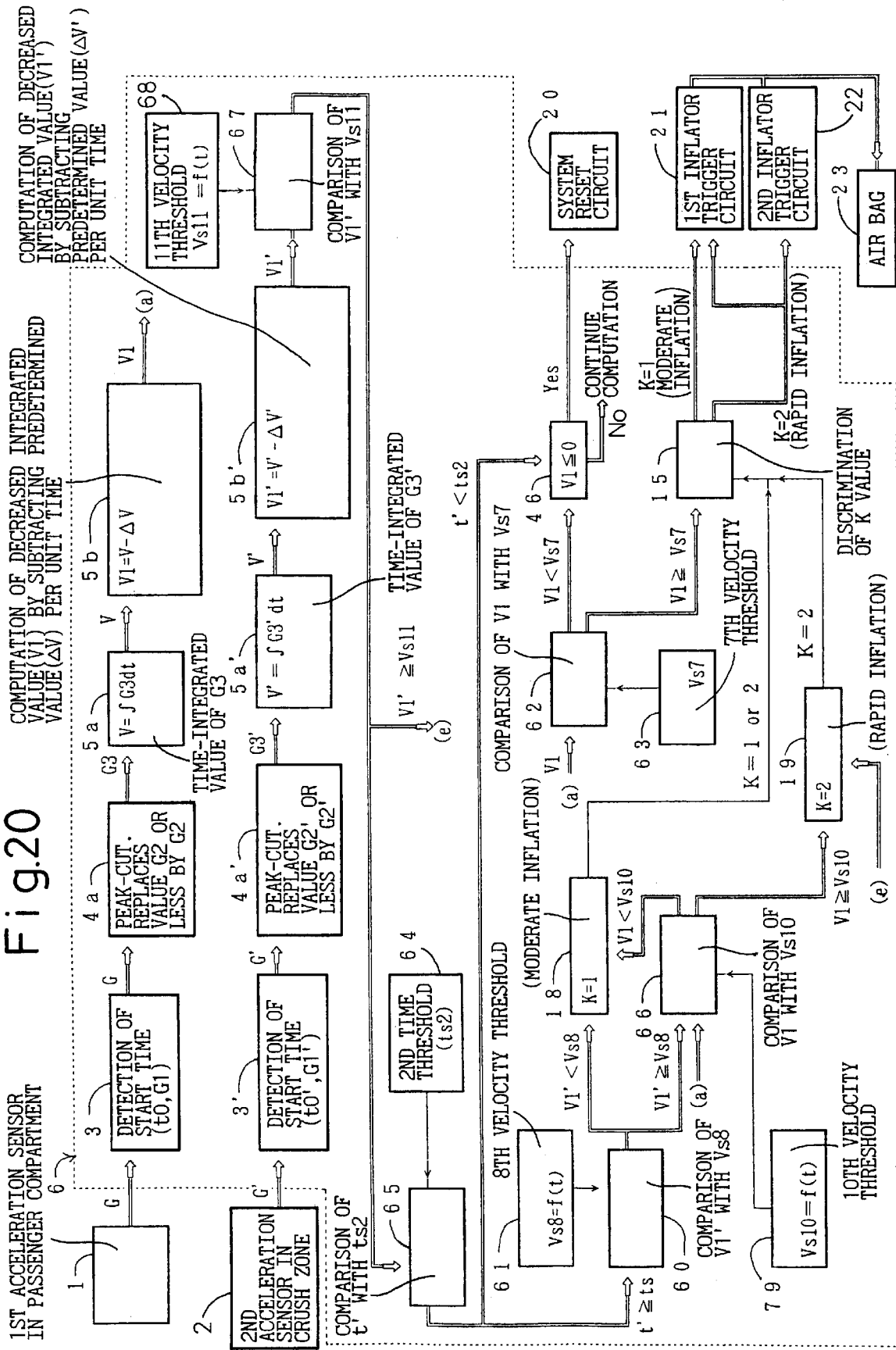

FIG. 20 shows a modification of the example of FIG. 19, wherein the same constituent elements as those in FIG. 19 are designated by the same reference numerals and will not be described in detail here. In the illustrated example, provisions are made to prevent a delay in inflator ignition timing in an extremely severe collision; as shown, the second time comparator 65 is preceded by a comparator 67 which compares the second time-integrated value V1 with an 11th velocity threshold value Vs11 preset in a block 68 as a function of time, and when the second time-integrated value V1' is equal to or larger than the 11th velocity threshold value Vs11 (V1'≧Vs11), the result is sent to the block 19 which thereupon issues a rapid air bag inflation signal (K=2). That is, when the second integrated-time value V1' shows an extremely large value, a rapid inflation command is issued, overriding the holding period during which the determination of the degree of collision severity by the time comparator 65 is on hold. The 11th velocity threshold value Vs11 in the block 68 is, therefore, set at a large value sufficient to prevent an erroneous activation.

Figure 21:
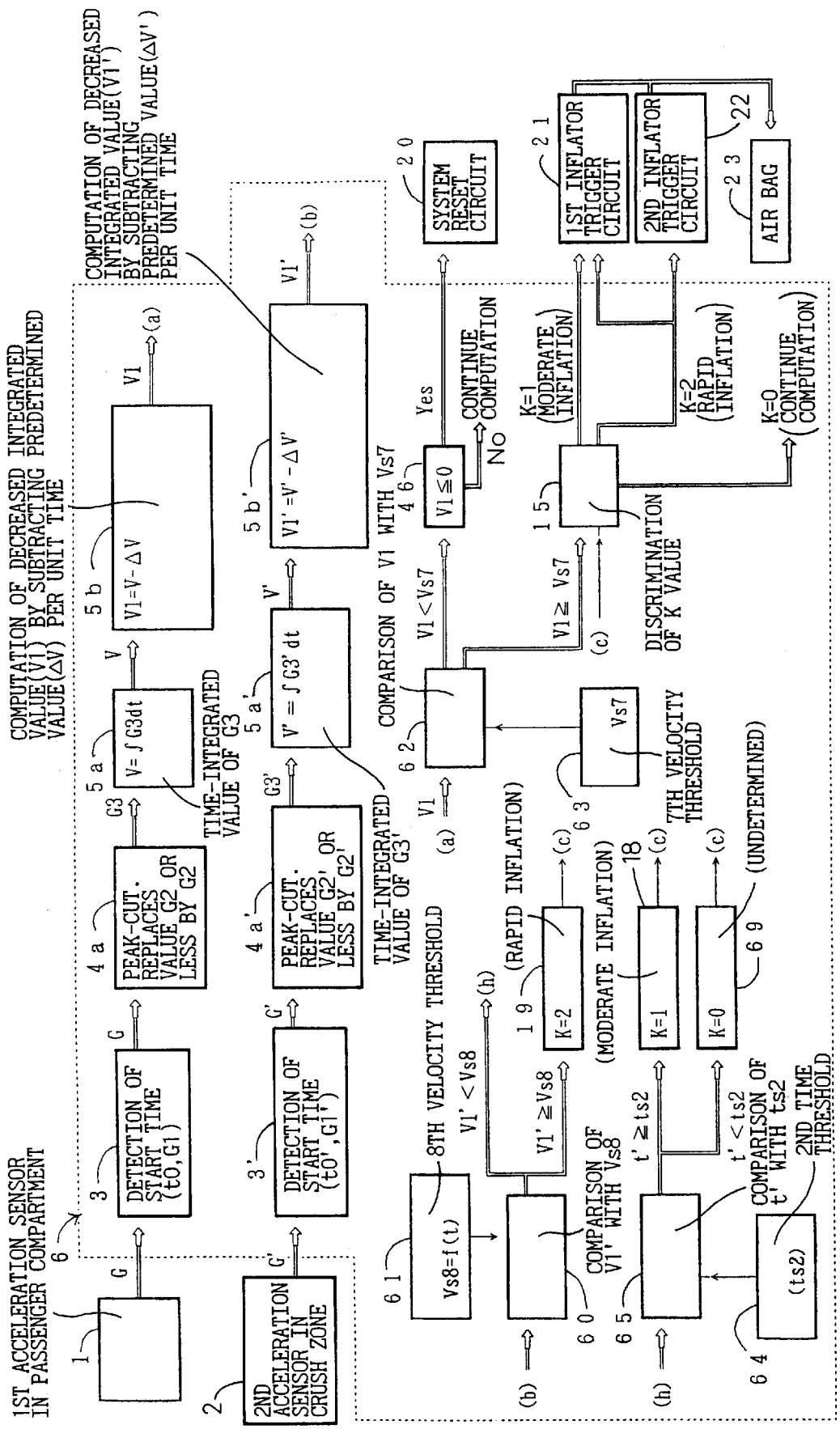

FIG. 21 shows a new embodiment wherein the concept of the time threshold value comparison shown in FIGS. 19 and 20 is applied to the method of FIG. 17. This embodiment is the same as the embodiment of FIG. 17 in that the second time-integrated value V1' is compared in the block 60 with the eighth velocity threshold value Vs8 and, when it is equal to or greater than the threshold value, i.e., V1'≧Vs8, it is determined that the situation requires a rapid inflation of the air bag, and the rapid inflation signal (K=2) is sent from the block 19 to the block 15, but differs in that when the second time-integrated value V1' is smaller than the threshold value (V1'<Vs8), the elapsed time t' from the starting of the computation based on the second acceleration sensor 2 is compared in the block 65 with the second time threshold value ts2; furthermore, when the elapsed time t' is equal to or larger than the second time threshold value ts2 (t' 2 ts2), the mode signal is set to moderate inflation, and the signal (K=1) is sent to the block 15, but when t'<ts2, the mode signal is set to activation mode undetermined, and the mode undetermined signal K=0 is sent from a block 69 to the block 15.

In the block 15, when the activation mode undetermined signal K=0 is input, the computation is allowed to continue, regardless of the presence or absence of the inflator activation/non-activation decision signal from the block 62. On the other hand, when the result of the inflator activation/non-activation decision in the block 62 shows the first time-integrated value V1≧the seventh velocity threshold value Vs7, and when the signal K=1 or 2 is input to the block 15, the inflator(s) are activated in accordance with the designated activation mode, as in the case of the foregoing example.

In this way, in determining the inflator activation mode, determination of only the rapid inflation can be effected before the prescribed time ts2 elapses from the starting time of the computation, but determination of the moderate inflation is held off and the computation is continued during that period. This prevents the moderate inflation signal from being determined by making a decision too early in the early stages of collision, and further improves the occupant protection performance of the air bag.

Figure 22:
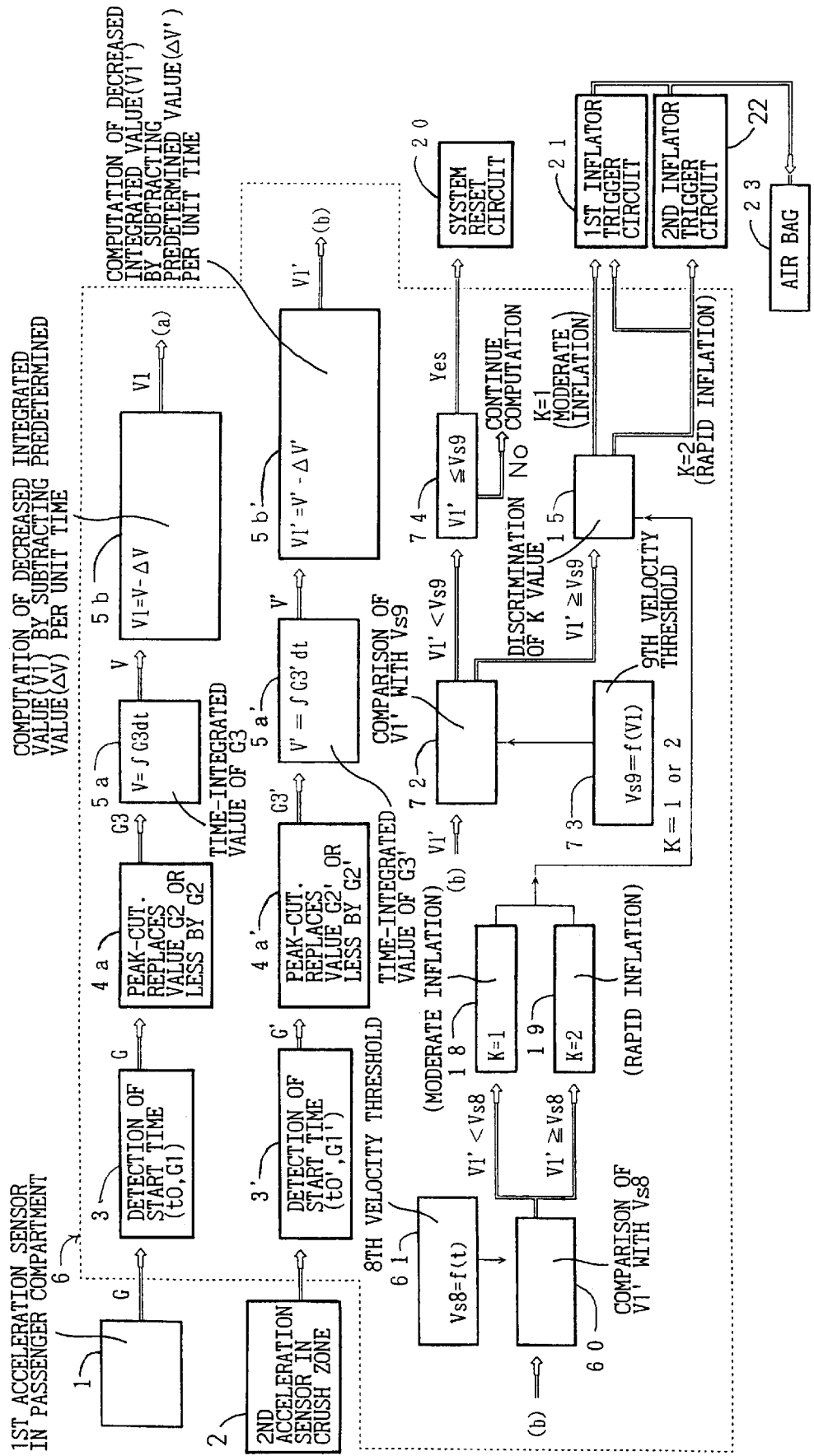

FIG. 22 shows still another embodiment of the present invention. In the methods of FIGS. 17 to 21, the inflator activation/non-activation decision is made based on the first time-integrated value V1, but the method of FIG. 22 significantly differs in that the second time-integrated value V1' is also used for the inflator activation/non-activation decision.

More specifically, the illustrated method is the same in that the inflator inflation mode is determined by comparing the second time-integrated value V1' with the eighth velocity threshold value Vs8, but fundamentally differs in that the second time-integrated value V1' is also sent to a comparator 72 where it is compared with a ninth velocity threshold value Vs9 supplied from a block 73, to determine whether to activate or not activate the inflator(s). Particularly, this ninth velocity threshold value Vs9 is set as a function of the first time-integrated value V1 (Vs9=f(V1)), and when the second time-integrated value is equal to or larger than the threshold value (V1'>Vs9), it is determined that inflator activation is needed, and the resultant signal is sent to the block 15. If the block 15 is supplied at this time with the activation mode signal (K=1 or K=2) from the inflator activation mode setting device 18 or 19, the block 15 sends a trigger signal to the first trigger circuit 21 and/or the second trigger circuit 22 according to the specified activation mode. On the other hand, when the second time-integrated value is smaller than the ninth velocity threshold value (V1'<Vs9), the resultant signal is sent to a comparator 74; if the second time-integrated value V1' is smaller than the value preset at or near zero (0), a signal is sent to the system reset circuit to reset the system, but if V1 is equal to or larger than the preset value, the computation is continued.

The relationship between the ninth velocity threshold value Vs9 (V1) used in the present embodiment and the second time-integrated value V1' will be described with reference to the previously given FIG. 16. Like the previously described sixth velocity threshold value Vs6(V1) shown in the same figure, the ninth velocity threshold value Vs9(V1) as a function of V1 is set as a hyperbolic function of V1 located between the 45-degree line and the V1, axis, and its value is also set at approximately the same level as the sixth velocity threshold value Vs6; that is, the smallest V1 value on the curve c along the V1' axis is set as a value slightly higher than the level of the deer collision shown in FIG. 12(A), while the curve d along the 45-degree line is so set as to be able to discriminate the low-speed frontal collision. In this way, by setting the threshold value as a function of the first time-integrated value V1, not as a function to time, stable discrimination not dependent on time can be expected.

Figure 23:
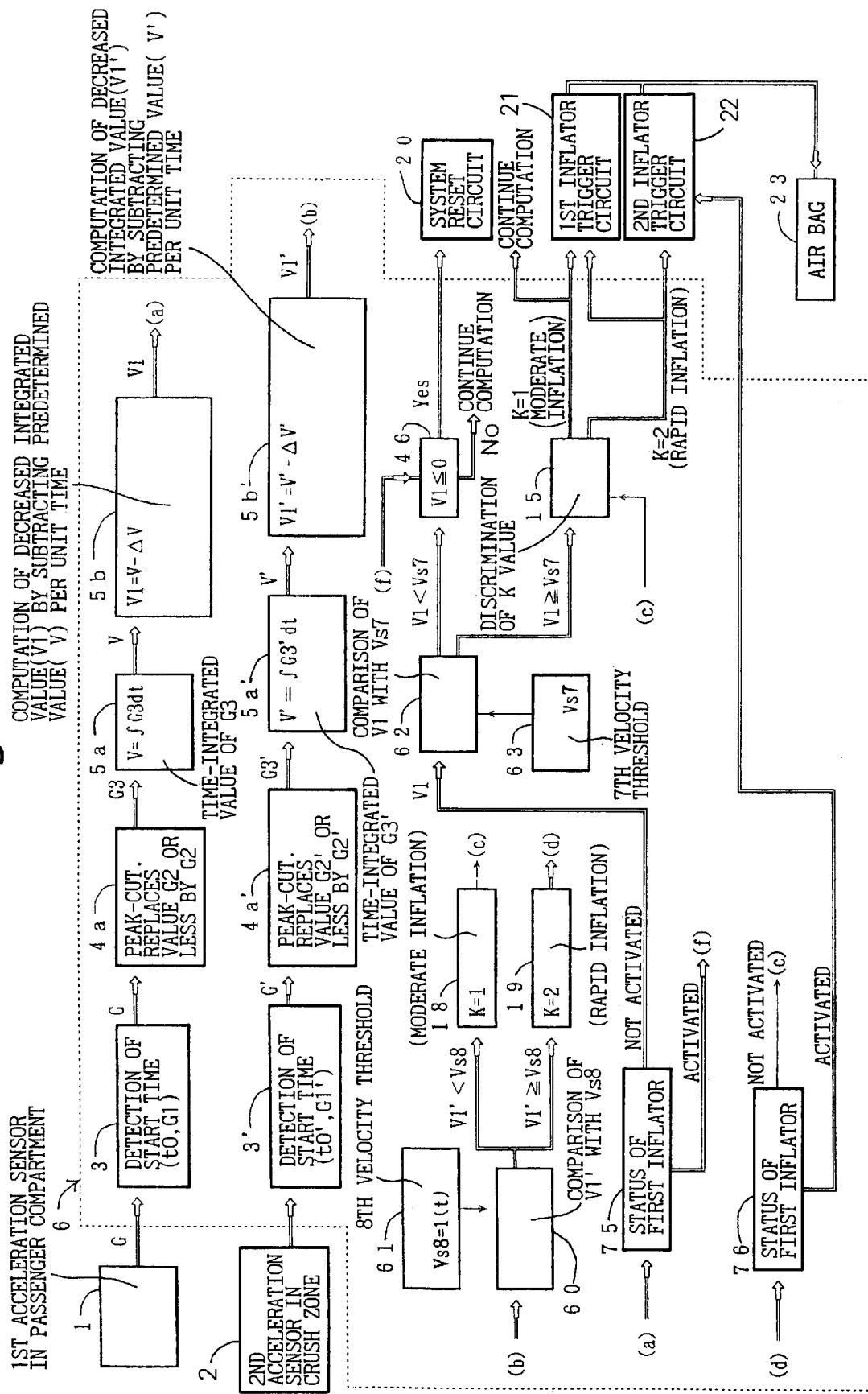

FIG. 23 shows a modification of the example of FIG. 19, wherein the same constituent elements as those in FIG. 19 are designated by the same reference numerals and will not be described in detail here. In the embodiments shown in FIGS. 17, 18, and 22, once the trigger command is issued from the block 15 to the inflator trigger circuits 21 and 22 in accordance with the inflator activation mode (K=1 or 2), the activation mode thus determined can no longer be changed. On the other hand, if too much emphasis is placed on the optimization of the activation mode, there arises the possibility of missing the inflator activation timing. In view of this, in FIGS. 19 and 20, determination of the inflator activation mode is held off during the predetermined period of time, while in FIG. 21, determination only of the moderate inflation is held off during the predetermined period of time; by contrast, in the present embodiment, when the result of the inflator activation/non-activation decision in the block 62 shows "activation needed", first only the first inflator is activated based on the moderate inflation command and, thereafter, if the inflator activation mode determination in the block 60 changes to the rapid inflation mode (K=2), the second inflator is activated at that instant in time.

More specifically, in FIG. 23, in the early stages of computation immediately after the collision, since the value of the second time-integrated value V1' has not yet accumulated to the point that exceeds the threshold value, the result of the inflator activation mode determination in the block 60 is V1'<Vs8, and the block 15 is therefore supplied with the moderate inflation signal K=1 from the block 18. On the other hand, the value of the first time-integrated value V1 is sent to a block 75 which then checks whether the first inflator is activated or not; if the first inflator is not activated, the block 62 compares V1 with the seventh velocity threshold value Vs7 to make a decision as to whether to activate or not activate the inflator. In the early stages of the computation, since the first time-integrated value V1 is also in the process of accumulating by time integration, the value is still below the threshold value Vs7, therefore, it is determined that V1<Vs7, and the signal is sent to the block 46; here, if V1≧0, the system is reset to stop the computation, as previously described, but when V1>0, the computation is continued. As the computation continues, the first time-integrated value V1 increases with time, and when V1≧Vs7, the inflator activation signal is sent to the block 15. By this time, the moderate inflation signal (K=1) has been input to the block 15 from the block 18; therefore, the block 15 instructs the first inflator trigger circuit 21 to ignite the first inflator which is thus ignited, and the air bag 23 starts to inflate at a moderate speed with a relatively small amount of gas released from the first inflator.

While the trigger signal is sent from the block 15 to the first inflator trigger circuit 21, the computation is further continued, and as a result, the second time-integrated value V1' increases as the time integration progresses; when the value reaches or exceeds the eighth velocity threshold value (V1'≧Vs8), the inflator activation mode signal switches to the rapid inflation signal K=2 which is output from the block 19 and sent to a block 76 which then checks whether the first inflator is activated or not. At this time, since the first inflator is already activated, as described above, the block 76 immediately sends a trigger command signal to the second inflator trigger circuit 22 to ignite the second inflator, and the air bag is thus rapidly inflated with a large amount of gas, combining the gas released from the first inflator with the gas released from the second inflator.

On the other hand, if the block 60 determines that the inflator activation mode should be set as the rapid inflation mode (K=2) before the block 62 determines that inflator activation is needed, since the first inflator activation status checked by the block 76 is "not activated", the signal (K=2) is sent to the block 15, and thereafter, when the block 62 determines that inflator activation is needed, the block 15 sends the trigger signal to both of the inflator trigger circuits 21 and 22 in accordance with the rapid inflation mode, and the air bag 23 is thus inflated in the same manner as in FIGS. 17 to 22.

As is apparent from the above description, in the methods of FIGS. 17 to 22, the value of the eighth velocity threshold value used for the inflator activation mode determination and the value of the seventh velocity threshold value used for the inflator activation/non-activation decision are selected so that the inflator activation mode determination in the block 60 is completed earlier than the inflator activation/non-activation decision in the block 62, but it is not possible to satisfy such conditions for all types of vehicle body structure and all types of collision. Considering that unpredictable situations can happen, it can be said that the method of the present embodiment that considers the possibility of rapid inflation becoming necessary, rather than fixing the inflator activation mode once determined, is a versatile method that is substantially unaffected by the vehicle body structure and that can be applied to extraordinary collision types as well.

Figure 24:
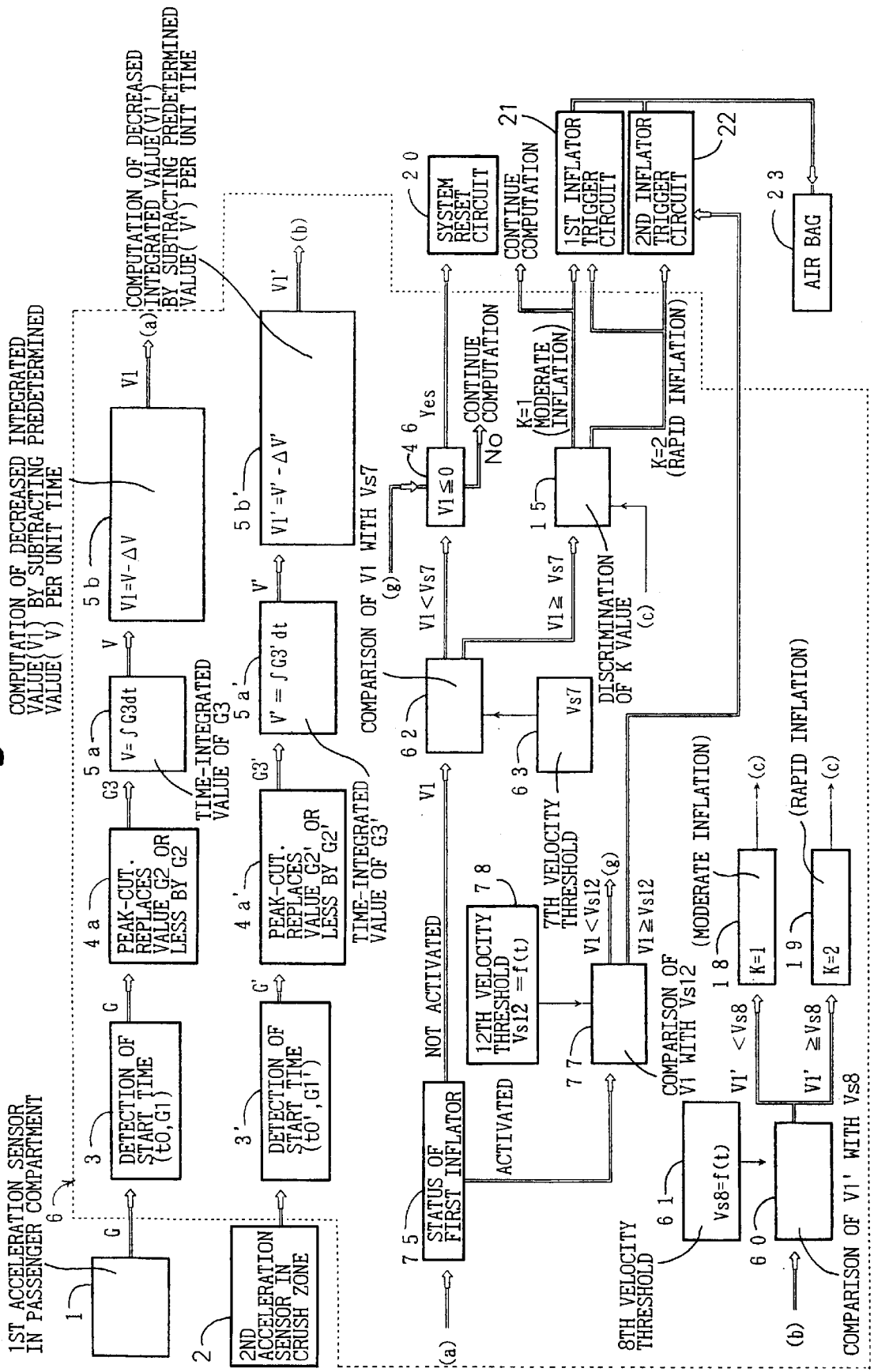

FIG. 24 is a block diagram showing a modified example of the method of FIG. 23, in which the output of the block 60 that determines the inflator activation mode is directly fed to the block 15, while the inflator activation/non-activation decision based on the first time-integrated value V1 is made using one of two routes according to the activation status of the first inflator. That is, the first time-integrated value V1 is first sent to the block 75 that judges the activation status of the first inflator, but in the early stages immediately after the collision, since the first inflator is not activated, the value is sent to the block 62 for comparison with the seventh velocity threshold value Vs7, as in the foregoing example, and when the value reaches or exceeds the threshold value, it is determined that inflator activation is needed, and the signal is sent to the block 15. Since the inflator activation mode signal from the block 18 or 19 is already input here, the trigger signal is sent to the inflator(s) in accordance with the activation mode signal; in the early stages of collision, when the moderate inflation signal K=1 is input, only the first inflator is activated to start the moderate inflation of the air bag 23, while on the other hand, the computation for the inflator activation/non-activation decision is continued.

When the first inflator is activated, the first time-integrated value V1 is now sent to a block 77, the other inflator activation/non-activation decision device, and compared with a 12th velocity threshold value Vs12 preset in a block 78. The 12th velocity threshold value Vs12 is set at a higher value than the seventh velocity threshold value Vs7 supplied to the block 62. When it is determined in the block 77 that V1≧Vs12, the trigger signal is immediately sent to the second inflator trigger circuit 22 to activate the second inflator, and thus the air bag is rapidly inflated with a large amount of high-pressure gas combining with the gas released from the earlier ignited first inflator. On the other hand, when V1<Vs12, the value is sent to the block 46 where a decision is made as to whether to continue or not continue the computation, as in the foregoing example.

More specifically, in the illustrated example, if the inflator activation mode determining device 60 determines that the activation mode should be set as the rapid inflation (K=2) before the inflator activation/non-activation decision device 62 determines that inflator activation is needed, the same operation as described in FIG. 17 is performed; on the other hand, when the activation mode is determined as the moderate inflation (K=1), if it is determined that inflator activation is needed, only the first inflator is activated while allowing the computation to continue, and thereupon, the activation/non-activation decision device is changed from the block 62 with the lower threshold value to the block 77 with the higher threshold value; thereafter, when the new activation/non-activation decision device determines that inflator activation is needed, the second inflator is immediately activated, thus switching the activation mode from the moderate inflation to the rapid inflation. In this way, if the inflator activation instruction is issued when the inflator activation mode is set as the moderate inflation, and if, thereafter, a situation occurs that demands switching to the rapid inflation mode because of the change of acceleration, the activation mode can be switched to the rapid inflation mode in the second inflator activation/non-activation decision process using the 12th velocity threshold value Vs12; this ensures stable switching from the moderate to the rapid inflation mode, regardless of the type of vehicle body structure or the type of collision, and occupant safety can thus be enhanced.

As described above, in the second method of the present invention, the decision whether to activate or not activate the inflators and the determination of the inflator activation mode are made utilizing the differences in output characteristics between the first time-integrated value V1 based on the acceleration signal from the first acceleration sensor mounted inside the passenger compartment and the second time-integrated value V1' based on the acceleration signal from the second acceleration sensor mounted in the crush zone; it will be appreciated, however, that the method of the invention is not limited to the specific examples illustrated in FIGS. 17 to 22, and that various modifications may be made in accordance with the spirit of the claims appended hereto. For example, the concept of the time threshold value shown in FIGS. 19 to 21, that is, the concept of holding off the activation mode determination for the designated inflator during the predetermined period of time, can be applied to the configuration of FIGS. 18 and 22 to 24; furthermore, it will be recognized that the combination of the threshold value for the activation mode determination and the threshold value for the activation/non-activation decision is not limited to the illustrated examples, but various other combinations are possible.

The above description has dealt with a system in which only the second acceleration sensor 2 is mounted in the crush zone and all other computing circuits are grouped together as the computation circuit 6 and mounted in an appropriate position within the passenger compartment, but alternatively, circuitry up to the integrating circuit 5a' or its subtracting circuit 5b' for the second acceleration sensor 2 may be mounted in the crush zone. The latter arrangement serves to reduce the cost of the system because the central computer mounted inside the passenger compartment is then supplied with the time-integrated value V' or V1' that does not require a high communication speed, not the acceleration signal G' that demands a high communication speed.

Each velocity threshold value may be set as a constant value, but it is preferable that each velocity threshold value is set as a function of time so that various types of collision can be easily responded to.

Further, the above description has dealt with examples in which the decreased integrated value V1 obtained by the subtracting means 5b is used as the first time-integrated value used for comparison in various comparators, but instead, the time-integrated value V obtained by the integrating means 5a may be used as the first time-integrated value. For example, suppose the case where V1 is used as the first time-integrated value and a comparison is made with the seventh velocity threshold value; here, if V is to be used as the first time-integrated value, since V=V1+ΔV, Vs7+ΔV should be used as the new seventh velocity threshold value, as comparing V1 with Vs7 is the same as comparing V with Vs7+ΔV. Therefore, either V or V1 may be used as the first time-integrated value, but the threshold value must be varied accordingly. Likewise, instead of using the decreased integrated value V1', the time-integrated value V' before the subtraction may be used as the second time-integrated value described in the above description, but in this case also, the threshold value must be varied accordingly.

Each of the embodiments shown in FIGS. 1 to 11 and 17 to 24 has been described dealing with the configuration using two inflators, but it will be appreciated that the present invention is equally applicable to configurations using three or more inflators. In the latter case, it is also possible to configure the system so that only a specified number of inflators are activated in the moderate inflation activation mode.

In the configuration using two inflators, a performance difference may be provided between the two inflators; for example, the performance of the first inflator is set at 70% of the total gas output and that of the second inflator at 30%, and control is performed so that in a collision of highest severity, the two inflators are ignited simultaneously, while in a collision of moderate severity, the first inflator is ignited first, followed with a certain delay by the second inflator, and in a collision of low severity, only the first inflator is ignited.

Further, rather than using a plurality of independent inflators, a single inflator whose housing is partitioned into a plurality of independent combustion chambers, each with an independent igniter and capable of being activated independently, may be used instead of the inflators in the present invention; the term "plurality of inflators" used in the present invention embraces all such variations, and it will be appreciated that any type of inflator having a plurality of independently ignitable gas generators can be used in the present invention, regardless of whether they are assembled into one unit or not.

As has been described above, according to the present invention, acceleration sensors are mounted in both the passenger compartment and the crush zone, and the decision whether to activate or not activate the inflators and the determination of the inflator activation mode are made utilizing the differences in characteristics that arise between the computed values of the acceleration signals detected by the two sensors in various types of collision due to the differences in the characteristics of these acceleration signals; this makes it possible to easily discriminate soft crashes, represented by impacts during rough road driving and low-speed collisions, which have been difficult to discriminate with traditional crash detection systems that relay only on the acceleration sensor mounted inside the passenger compartment. In particular, in the case of rough road driving or abuse that does not cause deformation to the crush zone, or in a low-speed collision that causes only minor deformation to the vehicle body, the waveforms of the two acceleration sensors are substantially the same, and the difference between the time-integrated values of the two signals is therefore extremely small. Using this difference between the time-integrated values directly or indirectly to discriminate between impacts requiring air bag inflation and impacts not requiring inflation, it becomes possible to perfectly prevent an erroneous activation of the air bag in a soft crash event, such as rough road driving or a low-speed collision, that involves only minor body deformation.

Furthermore, noting the characteristic that the second time-integrated value V1 based on the acceleration signal from the second acceleration sensor mounted in the crush zone increases rapidly in the early stages of collision compared with the first time-integrated value V1 based on the acceleration signal from the first acceleration sensor mounted inside the passenger compartment, the second time-integrated value V1' itself or the difference Vd between V1' and V1 or the amount of change, Gd, of the difference is compared with a threshold value provided as its time function, so that not only a severe collision such as a high-speed frontal or high-speed oblique collision, but also a medium-speed centerpole collision which the passenger compartment acceleration sensor tends to detect belatedly, can be detected in the very early stages of collision. As a result, not only the decision whether to inflate or not inflate the air bag (activation or non-activation of the inflators) but the determination of the air bag inflation mode (inflator activation mode) can be made with the correct timing without fear of activation delays.

Further, when using a plurality of inflators and controlling the inflator activation mode by providing a timing difference between the activation of one inflator and the activation of the next inflator, since a collision can be detected in the very early stages of the collision, sufficient time is allowed for computation from the time the collision is detected to the time the inflators are activated. Accordingly, complex computation can be performed for the inflator activation mode control, and thus the air bag inflation mode can be controlled to the optimum mode that matches the type of collision.

By setting the threshold value as a function of the first time-integrated value V1, stable discrimination performance not dependent on time can be achieved, and further by using it in combination with the earlier described time function threshold value, an air bag inflation determination system can be constructed that combines an early discrimination capability with a reliable determination capability.

When the inflator activation mode is moderate inflation, the computation is continued by holding off the determination of the mode until a predetermined time elapses; this prevents the moderate inflation mode to be determined too early, and enhances the accuracy of the proper activation mode determination.

Likewise, when the inflator activation mode is determined as moderate inflation, if an "activation needed" instruction is issued from the inflator activation/non-activation decision making circuit, a specified number of inflators are immediately activated in accordance with the moderate inflation mode, while allowing the computation to continue for the activation mode determination; thereafter, if the mode switches to the rapid inflation mode, the remaining inflators are immediately activated. In this configuration, air bag inflation can be initiated at an early stage, and the air bag inflation speed can be changed to that of rapid inflation depending on the change of the condition thereafter. This offers the effect of enhancing the accuracy of the activation mode control, further ensuring occupant safety.

In the description so far given, no mention has been made of a control method based on combinations of the seating position and posture of the occupants when the present invention is applied to the air bag system for the front passenger seat or rear seats, but it will be appreciated that the invention can also perform control based on such combinations. For example, to make a final decision as to whether to inflate or not inflate the air bag, an air bag activation/non-activation decision making circuit, which makes a decision as to whether to activate or not activate the air bag based on the seating position and posture of the occupant, may be provided immediately before or after the block 15 that issues the trigger signal to the first and second inflators. Provision may also be made to make a decision as to whether to inflate the air bag in moderate mode or rapid mode based on the seating position and posture of the occupant, and to couple the result of the decision to the discrimination system of the present invention to control the air bag inflation mode by providing priority order between the seating position and posture and the severity of the collision. That is, various application modes are possible without departing from the spirit of the invention as described in the appended claims, and the present invention does not exclude such variations.

POTENTIAL FOR EXPLOITATION IN INDUSTRY

As described above, the air bag activation control apparatus according to the present invention is capable of inflating the air bag in an optimum mode according to various types of collision, and is therefore very useful as a vehicle passenger protection apparatus.

What is claimed is:

1. An activation control apparatus for an air bag system having a plurality of inflators for one air bag, which, upon detection of a vehicle collision, controls activation of said inflators in accordance with the severity of said collision, comprising:

a first acceleration sensor (1), mounted in a position within a passenger compartment, for constantly detecting acceleration (G) at said mounting position; and a second acceleration sensor (2), mounted in a position within a crush zone in a forward part of a vehicle, for constantly detecting acceleration (G') at said mounting position, and wherein:

a decision as to whether to activate or not activate said plurality of inflators and determination of an activation mode of said inflators are made by utilizing differences in characteristics among various values in various types of collision and by combining said various values as appropriate, said various values consisting of a first time-integrated value (V1) obtained by performing time integration based on an acceleration signal from said first acceleration sensor (1) and a second time-integrated value (V1') obtained by performing time integration based on an acceleration signal from said second acceleration sensor (2), and of an integrated value difference between said second time-integrated value and said first time-integrated value (Vd=V'−V) or the amount of change of said integrated value difference (Gd=d(Vd)/dt), said integrated value difference (Vd) being compared with a first predetermined velocity threshold value (Vs1) provided as a function of time, and when said integrated value difference is not smaller than said threshold value (Vd≧Vs1), said inflators being activated in accordance with a separately selected inflator activation mode.

2. An activation control apparatus for an air bag system as claimed in claim 1, wherein said first time-integrated value (V1), obtained by performing time integration based on the acceleration signal (G) from said first acceleration sensor (1), is compared with a seventh predetermined velocity threshold value (Vs7) used to decide whether to activate or not activate said inflators, and when said first time-integrated value is not smaller than said seventh velocity threshold value (V1≧Vs7), said inflators are activated in accordance with said inflator activation mode determined by said prescribed computation performed based on the acceleration signal (G') from said second acceleration sensor (2).

3. An activation control apparatus for an air bag system as claimed in claim 2, wherein a first decision as to whether to activate or not activate said inflators is made by performing a prescribed computation in an inflator activation/non-activation decision-making computing circuit (70) based on the acceleration signal (G') from said second acceleration sensor (2), and the value of said seventh velocity threshold value (Vs7) is varied based on the result of said decision.

4. An activation control apparatus for an air bag system as claimed in claim 3, wherein as the result of said first decision in said inflator activation/non-activation decision-making computing circuit (70) as to whether to activate or not activate said inflators, if it is determined that inflator activation is needed, the value of said seventh velocity threshold value (Vs7) is varied in such a manner as to decrease relatively, while on the other hand, if it is determined that inflator activation is not needed, the value of said seventh velocity threshold value (Vs7) is varied in such a manner as to increase relatively.

5. An activation control apparatus for an air bag system having a plurality of inflators for one air bag, which, upon detection of a vehicle collision, controls activation of said inflators in accordance with the severity of said collision, comprising:

a first acceleration sensor (1), mounted in a position within a passenger compartment, for constantly detecting acceleration (G) at said mounting position; and a second acceleration sensor (2), mounted in a position within a crush zone in a forward part of a vehicle, for constantly detecting acceleration (G') at said mounting position, and wherein:

a decision as to whether to activate or not activate said plurality of inflators and determination of an activation mode of said inflators are made by utilizing differences in characteristics among various values in various types of collision and by combining said various values as appropriate, said various values consisting of a first time-integrated value (V1) obtained by performing time integration based on an acceleration signal from said first acceleration sensor (1) and a second time-integrated value (V1') obtained by performing time integration based on an acceleration signal from said second acceleration sensor (2), and of an integrated value difference between said second time-integrated value and said first time-integrated value (Vd=V'−V) or the amount of change of said integrated value difference (Gd=d(Vd)/dt), said integrated value difference (Vd) being compared with a first predetermined velocity threshold value (Vs1) provided as a function of time, and when said integrated value difference is not smaller than said threshold value (Vd≧Vs1), said inflators being activated in accordance with a separately selected inflator activation mode, the amount of change (Gd) of said integrated value difference being compared with a predetermined difference change threshold value (Gs) provided as a function of time, and when said amount of change is not smaller than said threshold value (Gd≧Gs), said inflators being activated in accordance with a separately selected inflator activation mode.

6. An activation control apparatus for an air bag system having a plurality of inflators for one air bag, which, upon detection of a vehicle collision, controls activation of said inflators in accordance with the severity of said collision, comprising:

a first acceleration sensor (1), mounted in a position within a passenger compartment, for constantly detecting acceleration (G) at said mounting position; and a second acceleration sensor (2), mounted in a position within a crush zone in a forward part of a vehicle, for constantly detecting acceleration (G') at said mounting position, and wherein:

a decision as to whether to activate or not activate said plurality of inflators and determination of an activation mode of said inflators are made by utilizing differences in characteristics among various values in various types of collision and by combining said various values as appropriate, said various values consisting of a first time-integrated value (V1) obtained by performing time integration based on an acceleration signal from said first acceleration sensor (1) and a second time-integrated value (V1') obtained by performing time integration based on an acceleration signal from said second acceleration sensor (2), and of an integrated value difference between said second time-integrated value and said first time-integrated value (Vd=V'−V) or the amount of change of said integrated value difference (Gd=d(Vd)/dt), said integrated value difference (Vd) being compared with a fifth predetermined velocity threshold value (Vs5) set as a function of said first time-integrated value (V1), and when said integrated value difference is not smaller than said fifth velocity threshold value (Vd≧Vs5), said inflators being activated in accordance with a separately selected inflator activation mode.

7. An activation control apparatus for an air bag system having a plurality of inflators for one air bag, which, upon detection of a vehicle collision, controls activation of said inflators in accordance with the severity of said collision, comprising:

a first acceleration sensor (1), mounted in a position within a passenger compartment, for constantly detecting acceleration (G) at said mounting position; and a second acceleration sensor (2), mounted in a position within a crush zone in a forward part of a vehicle, for constantly detecting acceleration (G') at said mounting position, and wherein:

a decision as to whether to activate or not activate said plurality of inflators and determination of an activation mode of said inflators are made by utilizing differences in characteristics among various values in various types of collision and by combining said various values as appropriate, said various values consisting of a first time-integrated value (V1) obtained by performing time integration based on an acceleration signal from said first acceleration sensor (1) and a second time-integrated value (V1') obtained by performing time integration based on an acceleration signal from said second acceleration sensor (2), and of an integrated value difference between said second time-integrated value and said first time-integrated value (Vd=V'−V) or the amount of change of said integrated value difference (Gd=d(Vd)/dt), said integrated value difference (Vd) being compared with said first velocity threshold value (Vs1) and the amount of change (Gd) of said integrated value difference being compared with said difference change threshold value (Gs), and when either one or two conditions, one requiring that said integrated value difference be not smaller than said first velocity threshold value (Vd≧Vs1) and the other requiring that said amount of change of said integrated value difference be not smaller than said difference change threshold value (Gd≧Gs), or both of said two conditions are satisfied, said inflators being activated in accordance with a separately selected inflator activation mode.

8. An activation control apparatus for an air bag system having a plurality of inflators for one air bag, which, upon detection of a vehicle collision, controls activation of said inflators in accordance with the severity of said collision, comprising:

a first acceleration sensor (1), mounted in a position within a passenger compartment, for constantly detecting acceleration (G) at said mounting position; and a second acceleration sensor (2), mounted in a position within a crush zone in a forward part of a vehicle, for constantly detecting acceleration (G') at said mounting position, and wherein:

a decision as to whether to activate or not activate said plurality of inflators and determination of an activation mode of said inflators are made by utilizing differences in characteristics among various values in various types of collision and by combining said various values as appropriate, said various values consisting of a first time-integrated value (V1) obtained by performing time integration based on an acceleration signal from said first acceleration sensor (1) and a second time-integrated value (V1') obtained by performing time integration based on an acceleration signal from said second acceleration sensor (2), and of an integrated value difference between said second time-integrated value and said first time-integrated value (Vd=V'−V) or the amount of change of said integrated value difference (Gd=d(Vd)/dt), said integrated value difference (Vd) being compared with a fifth predetermined velocity threshold value (Vs5) set as a function of said first time-integrated value (V1), and when said integrated value difference is not smaller than said fifth velocity threshold value (Vd≧Vs5), said inflators being activated in accordance with a separately selected inflator activation mode.

9. An activation control apparatus for an air bag system having a plurality of inflators for one air bag, which, upon detection of a vehicle collision, controls activation of said inflators in accordance with the severity of said collision, comprising:

a first acceleration sensor (1), mounted in a position within a passenger compartment, for constantly detecting acceleration (G) at said mounting position; and a second acceleration sensor (2), mounted in a position within a crush zone in a forward part of a vehicle, for constantly detecting acceleration (G') at said mounting position, and wherein:

a decision as to whether to activate or not activate said plurality of inflators and determination of an activation mode of said inflators are made by utilizing differences in characteristics among various values in various types of collision and by combining said various values as appropriate, said various values consisting of a first time-integrated value (V1) obtained by performing time integration based on an acceleration signal from said first acceleration sensor (1) and a second time-integrated value (V1') obtained by performing time integration based on an acceleration signal from said second acceleration sensor (2), and of an integrated value difference between said second time-integrated value and said first time-integrated value (Vd=V'−V) or the amount of change of said integrated value difference (Gd=d(Vd)/dt), said integrated value difference (Vd) being compared with said fifth velocity threshold value (Vs5) and the amount of change (Gd) of said integrated value difference being compared with said difference change threshold value (Gs), and when either one of two conditions, one requiring that said integrated value difference be not smaller than said fifth velocity threshold value (Vd≧Vs5) and the other requiring that said amount of change of said integrated value difference be not smaller than said difference change threshold value (Gd≧Gs), or both of said two conditions are satisfied, said inflators being activated in accordance with a separately selected inflator activation mode.

10. An activation control apparatus for an air bag system having a plurality of inflators for one air bag, which, upon detection of a vehicle collision, controls activation of said inflators in accordance with the severity of said collision, comprising:

a first acceleration sensor (1), mounted in a position within a passenger compartment, for constantly detecting acceleration (G) at said mounting position; and a second acceleration sensor (2), mounted in a position within a crush zone in a forward part of a vehicle, for constantly detecting acceleration (G') at said mounting position, and wherein:

a decision as to whether to activate or not activate said plurality of inflators and determination of an activation mode of said inflators are made by utilizing differences in characteristics among various values in various types of collision and by combining said various values as appropriate, said various values consisting of a first time-integrated value (V1) obtained by performing time integration based on an acceleration signal from said first acceleration sensor (1) and a second time-integrated value (V1') obtained by performing time integration based on an acceleration signal from said second acceleration sensor (2), and of an integrated value difference between said second time-integrated value and said first time-integrated value (Vd=V'−V) or the amount of change of said integrated value difference (Gd=d(Vd)/dt), said second time-integrated value (V1') being compared with a sixth predetermined velocity threshold value (Vs6) set as a function of said first time-integrated value (V1), and when said second time-integrated value is not smaller than said sixth velocity threshold value (V1'≧Vs6), said inflators being activated in accordance with a separately selected inflator activation mode.

11. An activation control apparatus for an air bag system having a plurality of inflators for one air bag, which, upon detection of a vehicle collision, controls activation of said inflators in accordance with the severity of said collision, comprising:

a first acceleration sensor (1), mounted in a position within a passenger compartment, for constantly detecting acceleration (G) at said mounting position; and a second acceleration sensor (2), mounted in a position within a crush zone in a forward part of a vehicle, for constantly detecting acceleration (G') at said mounting position, and wherein:

a decision as to whether to activate or not activate said plurality of inflators and determination of an activation mode of said inflators are made by utilizing differences in characteristics among various values in various types of collision and by combining said various values as appropriate, said various values consisting of a first time-integrated value (V1) obtained by performing time integration based on an acceleration signal from said first acceleration sensor (1) and a second time-integrated value (V1') obtained by performing time integration based on an acceleration signal from said second acceleration sensor (2), and of an integrated value difference between said second time-integrated value and said first time-integrated value (Vd=V'−V) or the amount of change of said integrated value difference (Gd=d(Vd)/dt), said second time-integrated value (V1') being compared with a sixth predetermined velocity threshold value (Vs6) set as a function of said first time-integrated value (V1) and said amount of change (Gd) of said integrated value difference being compared with said difference change threshold value (Gs), and when either one of two conditions, one requiring that said second time-integrated value is not smaller than said sixth velocity threshold value (V1'≧Vs6) and the other requiring that said amount of change of said integrated value difference be not smaller than said difference change threshold value (Gd≧Gs), or both of said two conditions are satisfied, said inflators being activated in accordance with a separately selected inflator activation mode.

12. An activation control apparatus for an air bag system having a plurality of inflators for one air bag, which, upon detection of a vehicle collision, controls activation of said inflators in accordance with the severity of said collision, comprising:

a first acceleration sensor (1), mounted in a position within a passenger compartment, for constantly detecting acceleration (G) at said mounting position; and a second acceleration sensor (2), mounted in a position within a crush zone in a forward part of a vehicle, for constantly detecting acceleration (G') at said mounting position, and wherein:

a decision as to whether to activate or not activate said plurality of inflators and determination of an activation mode of said inflators are made by utilizing differences in characteristics among various values in various types of collision and by combining said various values as appropriate, said various values consisting of a first time-integrated value (V1) obtained by performing time integration based on an acceleration signal from said first acceleration sensor (1) and a second time-integrated value (V1') obtained by performing time integration based on an acceleration signal from said second acceleration sensor (2), and of an integrated value difference between said second time-integrated value and said first time-integrated value (Vd=V'−V) or the amount of change of said integrated value difference (Gd=d(Vd)/dt), said integrated value difference (Vd) being compared with a second predetermined velocity threshold value (Vs2) provided as a function of time, and the activation mode of said inflators being determined based on the result of said comparison.

13. An activation control apparatus for an air bag system as claimed in claim 12, wherein said inflator activation mode consists of two kinds of modes, a moderate inflation for inflating said air bag at a moderate speed and a rapid inflation for rapidly inflating said air bag, and wherein when said compared value is not smaller than said threshold value, the activation mode for rapid inflation is selected, and when said compared value is smaller than said threshold value, the activation mode for moderate inflation is selected.

14. An activation control apparatus for an air bag system as claimed in claim 13, wherein in said moderate inflation, only a predetermined number of inflators selected from said plurality of inflators are activated so that said air bag is inflated at a moderate speed, while in said rapid inflation, said air bag is inflated rapidly by igniting all of said plurality of inflators simultaneously or by slightly displacing ignition timing between said inflators.

15. An activation control apparatus for an air bag system as claimed in claim 13, wherein in said moderate inflation, said air bag is inflated at a moderate speed by displacing ignition timing between said plurality of inflators, while in said rapid inflation, said air bag is inflated rapidly by igniting all of said plurality of inflators simultaneously.

16. An activation control apparatus for an air bag system as claimed in claim 13, wherein in said moderate inflation, said air bag is inflated at a moderate speed by increasing ignition timing difference between said plurality of inflators, while in said rapid inflation, said air bag is inflated rapidly by reducing the ignition timing difference between said plurality of inflators.

17. An activation control apparatus for an air bag system as claimed in claim 13, wherein when said moderate inflation is selected as a result of said inflator activation mode determination, if it is determined as a result of said inflator activation/non-activation decision that inflator activation is needed, only a predetermined number of inflators are immediately activated in accordance with said moderate inflation, while allowing computation to continue, and if, as a result of said computation, said inflator activation mode determination changes to said rapid inflation, then the remaining inflators are immediately activated.

18. An activation control apparatus for an air bag system as claimed in claim 17, wherein said inflators consist of two inflators, the first inflator and the second inflator, and wherein when said first inflator is in a non-activated state, the computation for said inflator activation/non-activation decision is performed, and when said moderate inflation is selected as a result of the computation for said inflator activation mode determination, if it is determined as a result of said inflator activation/non-activation decision that inflator activation is needed, said first inflator alone is immediately activated, while allowing the computation to continue for said inflator activation mode determination, and if, as a result of said computation, said inflator activation mode switches to said rapid inflation, said second inflator is immediately activated.

19. An activation control apparatus for an air bag system having a plurality of inflators for one air bag, which, upon detection of a vehicle collision, controls activation of said inflators in accordance with the severity of said collision, comprising:

a first acceleration sensor (1), mounted in a position within a passenger compartment, for constantly detecting acceleration (G) at said mounting position; and a second acceleration sensor (2), mounted in a position within a crush zone in a forward part of a vehicle, for constantly detecting acceleration (G') at said mounting position, and wherein:

a decision as to whether to activate or not activate said plurality of inflators and determination of an activation mode of said inflators are made by utilizing differences in characteristics among various values in various types of collision and by combining said various values as appropriate, said various values consisting of a first time-integrated value (V1) obtained by performing time integration based on an acceleration signal from said first acceleration sensor (1) and a second time-integrated value (V1') obtained by performing time integration based on an acceleration signal from said second acceleration sensor (2), and of an integrated value difference between said second time-integrated value and said first time-integrated value (Vd=V'−V) or the amount of change of said integrated value difference (Gd=d (Vd)/dt), said second time-integrated value (V1') being compared with a third predetermined velocity threshold value (Vs3) provided as a function of time, and the activation mode of said inflators being determined based on the result of said comparison.

20. An activation control apparatus for an air bag system having a plurality of inflators for one air bag, which, upon detection of a vehicle collision, controls activation of said inflators in accordance with the severity of said collision, comprising:

a first acceleration sensor (1), mounted in a position within a passenger compartment, for constantly detecting acceleration (G) at said mounting position; and a second acceleration sensor (2), mounted in a position within a crush zone in a forward part of a vehicle, for constantly detecting acceleration (G') at said mounting position, and wherein:

a decision as to whether to activate or not activate said plurality of inflators and determination of an activation mode of said inflators are made by utilizing differences in characteristics among various values in various types of collision and by combining said various values as appropriate, said various values consisting of a first time-integrated value (V1) obtained by performing time integration based on an acceleration signal from said first acceleration sensor (1) and a second time-integrated value (V1') obtained by performing time integration based on an acceleration signal from said second acceleration sensor (2), and of an integrated value difference between said second time-integrated value and said first time-integrated value (Vd=V'−V) or the amount of change of said integrated value difference (Gd=d (Vd)/dt), computations are started at time (t0) when the acceleration value (G) of said first acceleration sensor (1) exceeds a predetermined acceleration value (G1) and at time (t0') when the acceleration value (G') of said second acceleration sensor (2) exceeds a predetermined acceleration value (G1').

21. An activation control apparatus for an air bag system as claimed in claim 20, wherein a predetermined acceleration value (G2) is subtracted from the acceleration value (G) detected by said first acceleration sensor (1), the resulting difference value (G3) is integrated over time to calculate said first time-integrated value (V1), a predetermined acceleration value (G2') is subtracted from the acceleration value (G') detected by said second acceleration sensor (2), and the resulting difference value (G3') is integrated over time to calculate said second time-integrated value (V1').

22. An activation control apparatus for an air bag system as claimed in claim 20, wherein determination of said inflator activation mode for said moderate inflation is held off and said computations are continued until a predetermined time (ts) elapses from the time (t0') when the computation based on said second acceleration sensor (2) is started.

23. An activation control apparatus for an air bag system having a plurality of inflators for one air bag, which, upon detection of a vehicle collision, controls activation of said inflators in accordance with the severity of said collision, comprising:

a first acceleration sensor (1), mounted in a position within a passenger compartment, for constantly detecting acceleration (G) at said mounting position; and a second acceleration sensor (2), mounted in a position within a crush zone in a forward part of a vehicle, for constantly detecting acceleration (G') at said mounting position, and wherein:

a decision as to whether to activate or not activate said plurality of inflators and determination of an activation mode of said inflators are made by utilizing differences in characteristics among various values in various types of collision and by combining said various values as appropriate, said various values consisting of a first time-integrated value (V1) obtained by performing time integration based on an acceleration signal from said first acceleration sensor (1) and a second time-integrated value (V1') obtained by performing time integration based on an acceleration signal from said second acceleration sensor (2), and of an integrated value difference between said second time-integrated value and said first time-integrated value (Vd=V'−V) or the amount of change of said integrated value difference (Gd=d (Vd)/dt), the activation mode of said inflators being determined by performing a prescribed computation based on the acceleration signal (G') from said second acceleration sensor (2), and whether to activate or not activate said inflators being determined by performing a prescribed computation based on the acceleration signal (G) from said first acceleration sensor (1).

24. An activation control apparatus for an air bag system as claimed in claim 23, wherein said second time-integrated value (V1'), obtained by performing time integration based on the acceleration signal (G') from said second acceleration sensor (1'), is compared with an eighth predetermined velocity threshold value (Vs8) provided as a function of time, and the activation mode of said inflators is determined based on the result of said comparison, while said second time-integrated value (V1') is compared with a ninth velocity threshold value (Vs9(V1)) preset as a function of said first time-integrated value (V1) obtained by performing time integration based on the acceleration signal (G) from said first acceleration sensor (1), and whether to activate or not activate said inflators is determined based on the result of said comparison.

25. An activation control apparatus for an air bag system as claimed in 23, wherein said second time-integrated value (V1'), obtained by performing time integration based on the acceleration signal (G') from said second acceleration sensor (1'), is compared with an eighth predetermined velocity threshold value (Vs8) indicative of the degree of collision severity, and when said second time-integrated value is smaller than said eighth velocity threshold value (V1'<Vs8), an inflator activation mode for inflating said air bag at a moderate speed is selected, while on the other hand, when said second time-integrated value is not smaller than said eighth velocity there should value (V1'≧Vs8), an inflator activation mode for rapidly inflating said air bag is selected.

26. An activation control apparatus for an air bag system as claimed in claim 25, wherein said second time-integrated value (V1') is compared with said eighth velocity threshold value (Vs8) after an elapsed time (t') from the starting of the computation based on said second acceleration sensor (2) has reached a predetermined time (ts).

27. An activation control apparatus for an air bag system as claimed in claim 25, wherein until an elapsed time (t')

from the starting of the computation based on said second acceleration sensor (2) reaches a predetermined time (ts), determination of said inflator activation mode for said moderate inflation is held off and the computation is continued.

28. An activation control apparatus for an air bag system as claimed in claim 27, wherein when said second time-integrated value (V1') is compared with said eighth velocity threshold value (Vs8), if said second time-integrated value is smaller than said eighth velocity threshold value (V1'<Vs8), the elapsed time (t') from the starting of the computation based on said second acceleration sensor (2) is compared with said predetermined time (ts), and if said elapsed time is not less than said predetermined time (t'≧ts), the inflator activation mode for inflating said air bag at a moderate speed is selected, but if said elapsed time is less than said predetermined time (t'<ts), the computation is continued.

29. An activation control apparatus for an air bag system as claimed in claim 25, wherein when inflating said air bag at a moderate speed as the result of said inflator activation mode determination, only a predetermined number of inflators selected from said plurality of inflators are activated, and when rapidly inflating said air bag, all of said plurality of inflators are activated simultaneously or by displacing ignition timing between said inflators.

30. An activation control apparatus for an air bag system as claimed in claim 25, wherein when inflating said air bag at a moderate speed as the result of said inflator activation mode determination, said plurality of inflators are activated in sequence by displacing ignition timing between said inflators, and when rapidly inflating said air bag, said plurality of inflators are activated simultaneously.

31. An activation control apparatus for an air bag system as claimed in claim 23, wherein said second time-integrated value (V1'), obtained by performing time integration based on the acceleration signal (G') from said second acceleration sensor (1'), is compared with an eighth predetermined velocity threshold value (Vs8) indicative of the degree of collision severity, and when said second time-integrated value is smaller than said eighth velocity threshold value (V1'<Vs8), an inflator activation mode for causing said air bag to inflate at a moderate speed is selected, while on the other hand, when said second time-integrated value is not smaller than said eighth velocity threshold value (V1'≧Vs8), then said first time-integrated value (V1) is compared with a 10th velocity threshold value (Vs10) which is preset as a value relatively larger than said eighth velocity threshold value, and if said first time-integrated value is not smaller than said 10th velocity threshold value (V1≧Vs10), an inflator activation mode for causing said air bag to inflate rapidly is selected, but if said first time-integrated value is smaller than said 10th velocity threshold value (V1<Vs10), an inflator activation mode for causing said air bag to inflate at a moderate speed is selected.

32. An activation control apparatus for an air bag system as claimed in claim 23, wherein said second time-integrated value (V1') is compared with an 11th predetermined velocity threshold value (Vs11) indicative of the degree of collision severity, and when said second time-integrated value is not smaller than said 11th velocity threshold value (V1'≧Vs11), an inflator activation mode for causing said air bag to inflate rapidly is selected, while on the other hand, when said second time-integrated value is smaller than said 11th velocity threshold value (V1'<Vs11), then said second time-integrated value (V1') is further compared with an eighth predetermined velocity threshold value (Vs8), and if said second time-integrated value is smaller than said eighth velocity threshold value (V1'<Vs8), an inflator activation mode for causing said air bag to inflate at a moderate speed is selected, but if second time-integrated value is not smaller than said eighth velocity threshold value (V1'≧Vs8), an inflator activation mode for causing said air bag to inflate rapidly is selected, and wherein the value of said 11th velocity threshold value (Vs11) is set higher than the value of said eighth velocity threshold value (Vs8), and said second time-integrated value (V1') is compared with said eighth velocity threshold value (Vs8) after an elapsed time (t') from the starting of the computation based on said second acceleration sensor (2) has reached a predetermined time (ts).

33. An activation control apparatus for an air bag system as claimed in any claim 23, wherein when a moderate inflation of said air bag is determined as a result of said inflator activation mode determination, if it is determined as a result of said inflator activation/non-activation decision that inflator activation is needed, a predetermined number of inflators selected from said plurality of inflators are activated in accordance with said moderate air bag inflation, while allowing the computation to continue for said inflator activation mode determination, and if, as a result of said computation, said inflator activation mode determination changes to a rapid air bag inflation, then the remaining inflators are immediately activated.

34. An activation control apparatus for an air bag system as claimed in claim 33, wherein said inflators consist of two inflators, the first inflator and the second inflator, and wherein when said first inflator is in a non-activated state, the computation for said inflator activation/non-activation decision based on the comparison between said first time-integrated value (V1) and said seventh velocity threshold value (Vs7) is performed, and when the inflator activation mode for causing said air bag to inflate at a moderate speed is selected as a result of the computation for said inflator activation mode determination based on the comparison between said second time-integrated value (V1') and said eighth velocity threshold value (Vs8), if it is determined as a result of said inflator activation/non-activation decision that inflator activation is needed, said first inflator alone is activated, while allowing the computation to continue for said inflator activation mode determination, and if, as a result of said computation, said inflator activation mode switches to the mode for causing said air bag to inflate rapidly, and if it is confirmed that said first inflator is already activated, then said second inflator is immediately activated.

35. An activation control apparatus for an air bag system as claimed in claim 33, wherein said inflators consist of two inflators, the first inflator and the second inflator, and wherein when said first inflator is in a non-activated state, the computation for said inflator activation/non-activation decision based on the comparison between said first time-integrated value (V1) and said seventh velocity threshold value (Vs7) is performed, and when the inflator activation mode for causing said air bag to inflate at a moderate speed is selected as a result of the computation for said inflator activation mode determination based on the comparison between said second time-integrated value (V1') and said eighth velocity threshold value (Vs8), if it is determined as a result of said inflator activation/non-activation decision that inflator activation is needed, said first inflator alone is activated, while allowing the computation to continue for said inflator activation/non-activation decision, and in the process of said computation, when the activation of said first inflator is confirmed, said first time-integrated value (V1) is then compared with a 12th predetermined velocity threshold value (Vs12) which is set as a larger value than said seventh velocity threshold value (Vs7), and if said first time-integrated value is not smaller than said 12th velocity threshold value (V1≧Vs12), said second inflator is immediately activated.

36. An activation control apparatus for an air bag system as claimed in claim 23, including: peak-cut means (4a') for starting the computation based on the acceleration value (G') of said second acceleration sensor (2) at time (t0') when said acceleration value (G') exceeds a predetermined acceleration value (G1'), and for peak-cutting any acceleration values from said acceleration value (G') that are not greater than a predetermined value (G2'); and time-integrating means (5a') for integrating said peak-cut acceleration value (G3') over time, and wherein: a time-integrated value (V1) obtained by said time integrating means is taken as said second time-integrated value.

37. An activation control apparatus for an air bag system as claimed in claim 23, including: peak-cut means (4a) for starting the computation based on the acceleration value (G) of said first acceleration sensor (1) at time (t0) when said acceleration value (G) exceeds a predetermined acceleration value (G1), and for peak-cutting any acceleration values from said acceleration value (G) that are not greater than a predetermined value (G2); and time-integrating means (5a) for integrating said peak-cut acceleration value (G3) over time, and wherein: a time-integrated value (V) obtained by said time-integrating means (5a) is taken as said first time-integrated value.

38. An activation control apparatus for an air bag system as claimed in claim 23, including: peak-cut means (4a') for starting the computation based on the acceleration value (G') of said second acceleration sensor (2) at time (t0') when said acceleration value (G') exceeds a predetermined acceleration value (G1'), and for peak-cutting any acceleration values from said acceleration value (G') that are not greater than a predetermined value (G2'); time-integrating means (5a') for integrating said peakcut acceleration value (G3') over time; and subtracting means (5b') for subtracting a predetermined velocity change value (V') from the time-integrated value (V') obtained by said time-integrating means, and wherein: a second decreased integrated value (V1') obtained by said subtracting means is taken as said second time-integrated value.

39. An activation control apparatus for an air bag system as claimed in claim 23, including: peak-cut means (4a) for starting the computation based on the acceleration value (G) of said first acceleration sensor (1) at time (t0) when said acceleration value (G) exceeds a predetermined acceleration value (G1), and for peak-cutting any acceleration values from said acceleration value (G) that are not greater than a predetermined value (G2); time-integrating means (5a) for integrating said peak-cut acceleration value (G3) over time; and subtracting means (5b) for subtracting a predetermined velocity change value (ΔV) from the time-integrated value (V) obtained by said time-integrating means (5a), and wherein: a decreased integrated value (V1) obtained by said subtracting means (5b) is taken as said first time-integrated value.

40. An activation control apparatus for an air bag system as claimed in claim 23, wherein computing circuitry from said second acceleration sensor (2) up to time-integrating means (5a') for performing time integration based on the acceleration signal (G') thereof or up to subtracting means (5b') is mounted in said crush zone.

* * * * *

UNITED STATES PATENT AND TRADEMARK OFFICE
CERTIFICATE OF CORRECTION

PATENT NO.    : 6,330,500 B1  
DATED         : December 11, 2001  
INVENTOR(S)   : Moriyama et al.

It is certified that error appears in the above-identified patent and that said Letters Patent is hereby corrected as shown below:

<u>Title page,</u>  
Item [63], Foreign Application Priority Data "May 16, 1987" should read -- May 16, 1997 --

Signed and Sealed this

Third Day of September, 2002

*Attest:*

JAMES E. ROGAN  
*Attesting Officer*    *Director of the United States Patent and Trademark Office*